(12) United States Patent
Irvine

(10) Patent No.: US 8,599,827 B2
(45) Date of Patent: Dec. 3, 2013

(54) METHODS AND APPARATUSES FOR MAINTAINING SYNCHRONIZATION BETWEEN A RADIO EQUIPMENT CONTROLLER AND AN ITEM OF RADIO EQUIPMENT

(75) Inventor: Garrick Thomas Irvine, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 224 days.

(21) Appl. No.: 13/278,212

(22) Filed: Oct. 21, 2011

(65) Prior Publication Data

US 2013/0100948 A1   Apr. 25, 2013

(51) Int. Cl.
*H04J 3/06*   (2006.01)

(52) U.S. Cl.
USPC ........................................................ 370/350

(58) Field of Classification Search
USPC ........................................................ 370/350
See application file for complete search history.

(56) References Cited

U.S. PATENT DOCUMENTS

2009/0180423 A1   7/2009   Kroener

FOREIGN PATENT DOCUMENTS

| EP | 1744572 A1 | 1/2007 |
|---|---|---|
| EP | 1827036 B1 | 4/2010 |
| WO | 2010145187 A1 | 12/2010 |

*Primary Examiner* — Dang Ton
*Assistant Examiner* — Nourali Mansoury
(74) *Attorney, Agent, or Firm* — Coats & Bennett, P.L.L.C.

(57) ABSTRACT

The present invention comprises methods and apparatuses for maintaining radio network timing synchronization across an asynchronous communication link between a Radio Equipment Controller (REC) and an item of Radio Equipment (RE). An REC-side adaptor sends first and second asynchronous packet flows over the asynchronous communication link, including a downlink packet flow comprising CPRI basic frames and overhead information encapsulated in asynchronous communication link packets, and a synchronization packet flow comprising CPRI clock data. An RE-side adaptor recovers the CPRI clock from the synchronization packet flow, and uses the recovered clock to re-synchronize the downlink data recovered from the downlink packet flow. For the uplink, the RE outputs uplink traffic in a synchronous, CPRI-compliant stream that is then encapsulated for asynchronous transport by the RE-side adaptor. The REC-side adaptor reconstitutes the asynchronously received uplink data as a synchronous, CPRI-compliant stream for input to the REC.

33 Claims, 11 Drawing Sheets

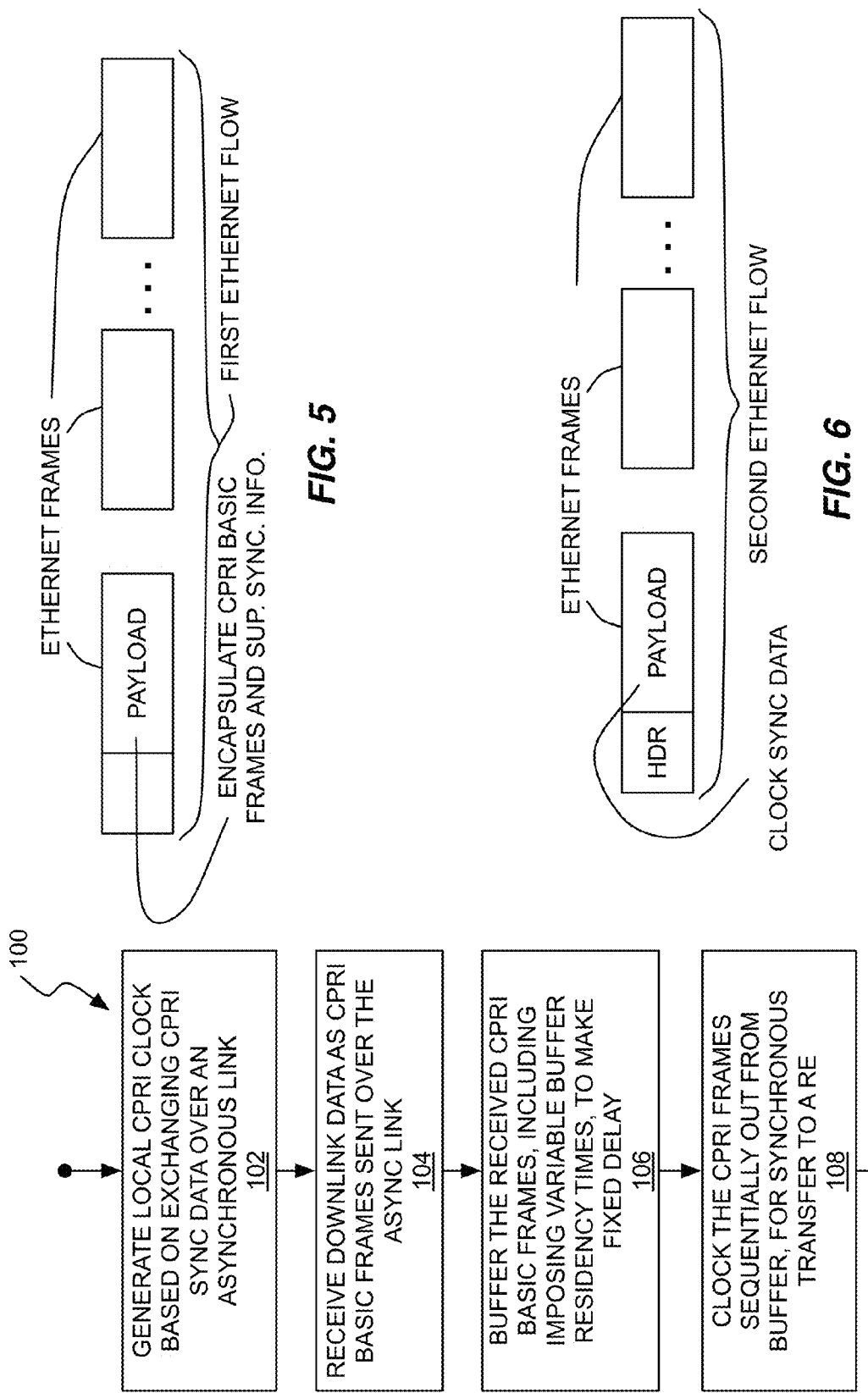

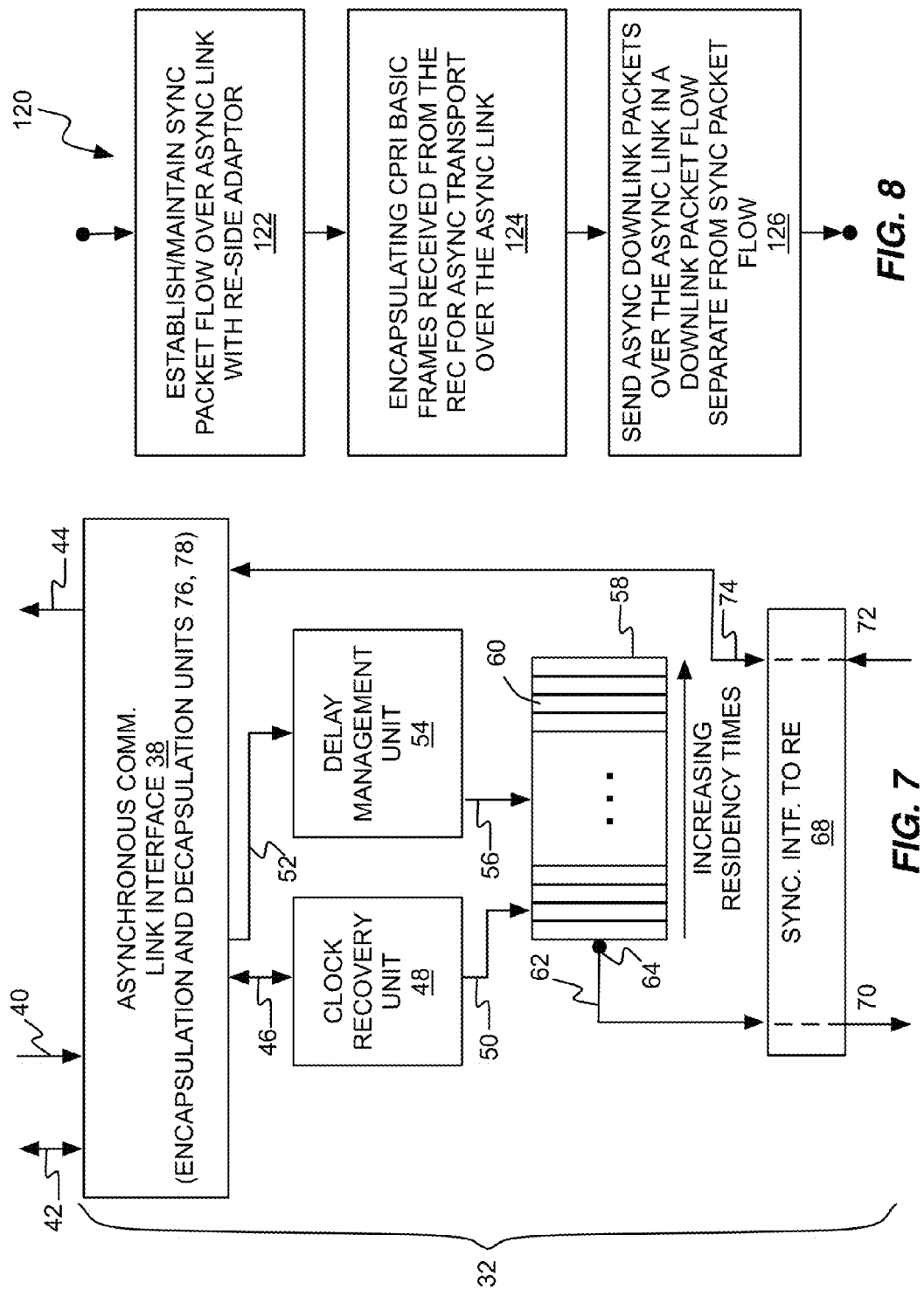

US 8,599,827 B2

METHODS AND APPARATUSES FOR MAINTAINING SYNCHRONIZATION BETWEEN A RADIO EQUIPMENT CONTROLLER AND AN ITEM OF RADIO EQUIPMENT

TECHNICAL FIELD

The present invention generally relates to items of radio equipment and their respective radio equipment controllers and maintaining data synchronization between them.

BACKGROUND

Partitioning Base Transceiver Station (BTS) equipment into a radio equipment (RE) part and a radio equipment controller (REC) part allows physical separation between the RE and REC. Separation has certain advantages, for example it allows one REC to control multiple, distributed REs. Here, "RE" should be understood as broadly encompassing base station repeater transceiver nodes.

An RE is connected via an analog RF feeder to the antenna that forms the BTS signaling air-interface. The fidelity of the signals transmitted and received via the antenna is degraded by feeder losses and hence it is advantageous for the RE to be placed close to the antenna. Typically, there are many REs assigned to an REC. Such an arrangement allows signal processing resources in the REC to be shared among the attached REs.

Any loss in fidelity of the signal as it is exchanged between an RE and its controlling REC can be effectively eliminated by first converting the analog signal that exists at the antenna into a digital signal within the RE. Hence, the interface between the REC and RE ideally is digital. The digitized signal sampled at a minimum sample rate required to faithfully represent the signal is often called the baseband. Other essential functions of the REC/RE interface include synchronization, control and management. Synchronization transfers timing information typically resident in the REC. Control and management provides access-control, operation, administration and maintenance.

Synchronization over the REC/RE link represents a key function. A master clock is typically resident in the REC and this clock must be transferred to the RE, so that the RE provides a synchronous air-interface (at the antenna). The master clock is traceable to a common time base in order to coordinate with other BTSs in the network. Put simply, the ability to maintain common and precise radio timing between an REC and its REs, and across multiple RECs and their respective REs, depends on accurate synchronization of radio timing at all REs.

Response-time processing represents another key consideration. In particular, response-time processing imposes a minimum round-trip latency criterion on the REC/RE link. As a practical matter, this requirement implies that no baseband samples may experience a delay that would exceed the ½ the minimum round-trip latency criterion.

An industry group has developed a standardized protocol for the REC/RE interface called Common Public Radio Interface (CPRI). CPRI is partitioned into the following data flows: control plane, management plane, synchronization plane and user plane. The user plane transfers the baseband; other flows are overhead. Comprehensive details regarding the CPRI specification are available in the interface specification document entitled, *Common Public Radio Interface (CPRI); Interface Specification*, V4.2 (2010-09-29).

The CPRI specification provides for the sort of precision and deterministic timing needed to transfer downlink data, timing, and control information from an REC to an RE and, conversely, transfer uplink data and control information from the RE to the REC. CPRI also provides for control and timing between an REC and two or more daisy-chained REs. Yet the CPRI protocol must be understood as a dedicated link; it is specialized for use in linking network nodes in the wireless communication network environment and it is not particularly robust with respect to transport impairments on the point-to-point links. In general, the specification assumes the use of synchronous, dedicated communication links between RECs and REs.

Such links may be impractical to implement, or they may not be economical as compared to other types of links. Asynchronous communication links, which may have multiple routing hops, may be cheaper and/or more easily deployed. As an example, Ethernet-based packet data networks are ubiquitous, and hence would be potentially advantageous for use as the REC/RE transport links. Yet, because of their asynchronous nature, such links are not particularly well suited for distributing the type of precisely synchronized data and control information that flows between RECs and REs.

There are known approaches for distributing timing synchronization information across asynchronous communication links. The IEEE 1588 standard represents one such approach. In particular, the IEEE 1588 standard proposes packet-based synchronization methods that can meet the stringent accuracy and reliability requirements of RE/REC synchronization. Packet-based synchronization as proposed by IEEE 1588 has two key attributes: (1) there is no dependency on the transport physical layer to provide inherent synchronization; and (2) the phase and frequency of the reference clock can be recovered.

Significant challenges remain with respect to using Ethernet or other asynchronous communication links, particularly with respect to the multiple hop scenario where asynchronous packets or frames transit through more than one router on the path between the routing endpoints. For example, because of the asynchronous nature of the Ethernet protocol, packets on an Ethernet link are subject to a variable queuing delay at every switching node on the routing path. Moreover, the basic Ethernet protocol does not guarantee that packets will be delivered in order, or even at all—although there are protocol mechanisms available for resending dropped packets. Thus, the transport link delay of the typical asynchronous communication link is variable rather than deterministic, which is not acceptable for the precise, deterministic timing required for CPRI-based synchronization between an REC and an RE.

SUMMARY

The present invention comprises methods and apparatuses for maintaining radio network timing synchronization across an asynchronous communication link between a Radio Equipment Controller (REC) and an item of Radio Equipment (RE) in a manner that is transparent to the CPRI-compliant interfaces of the REC and RE. According to one aspect of the present invention, a pair of adaptors communicates over the asynchronous communication link. One adaptor is at the REC and the other one is at the RE, with an asynchronous communication link interconnecting them, e.g., a multi-hop, asynchronous Ethernet connection. The REC-side and RE-side adaptors exchange CPRI timing information via the asynchronous communication link—synchronization data—in a synchronization packet flow that is separate from the downlink and uplink packet flows exchanged between them.

As their names indicate, the downlink and uplink packet flows respectively encapsulate CPRI basic frames carrying downlink data and CPRI control information in the downlink direction, and uplink data and CPRI control information in the uplink direction.

In more detail, the REC-side adaptor acts as a synchronous-to-asynchronous adaptor in the downlink direction towards the RE, and acts as asynchronous-to-synchronous adaptor in the uplink directions towards the REC. The REC-side adaptor synchronously receives CPRI basic frames from the REC, encapsulates those CPRI basic frames into asynchronous downlink packets, and sends the asynchronous downlink packets over the asynchronous communication link towards the RE-side adaptor in a downlink packet flow. In the opposite direction, the REC-side adaptor receives an uplink packet flow comprising asynchronous uplink packets comprising CPRI basic frames encapsulated by the RE-side adaptor for asynchronous transport to the REC-side adaptor via the asynchronous communication link. The REC-side adaptor extracts the CPRI basic frames from the received asynchronous uplink packets and provides them to the REC in a CPRI-compliant synchronous stream.

Conversely, the RE-side adaptor operates as an asynchronous-to-synchronous adaptor in the downlink direction towards the RE, and operates as a synchronous-to-asynchronous adaptor in the uplink direction towards the REC. As such, the RE-side adaptor receives the asynchronous downlink packets from the REC-side adaptor in the downlink packet flow, and extracts the encapsulated CPRI basic frames contained in them, and delivers the extracted CPRI basic frames to the RE in a synchronous, CPRI-compliant stream. The RE-side adaptor also receives a synchronous, CPRI-compliant stream from the RE in the uplink direction, where the CPRI basic frames in the uplink direction carry uplink data to be sent to the REC. Correspondingly, the RE-side adaptor encapsulates these CPRI basic frames into asynchronous uplink packets, which are then sent to the REC-side adaptor in the uplink packet flow carried over the asynchronous communication link.

Advantageously, the REC-side adaptor is configured to dynamically adapt the buffer residency times of the CPRI basic frames recovered from the uplink packet flow as a function of the variable transport delay incurred by the asynchronous uplink packets conveyed in the uplink packet flow. Similarly, but in the opposite direction, the RE-side adaptor is configured to dynamically adapt the buffer residency times of the CPRI basic frames recovered from the downlink packet flow as a function of the variable transport delay incurred by the asynchronous downlink packets conveyed in the downlink packet flow.

Further in this context, the REC-side adaptor extends CPRI synchronization from the REC to the RE by maintaining a bi-directional synchronization packet flow with the RE-side adaptor, which allows the RE-side adaptor to recover the REC's CPRI timing and thereby extend the REC's CPRI clock domain to the RE. As a consequence, the present invention masks the variable latency of the asynchronous communication link and provides for a fixed transport delay between the REC and RE, thereby permitting the REC and the RE to operate with synchronous, CPRI-compliant interfaces. Broadly, then, the REC- and RE-side adaptors control their buffering operations to impose a static, overall round-trip delay for CPRI basic frames flowing between the REC and RE, despite the potentially significant delay variability of the asynchronous communication link.

As such, the present invention allows for the use of economical, readily available asynchronous communication links between CPRI-compliant RECs and REs, such as single- and multi-hop Ethernet links, in a manner that is transparent to the CPRI-compliant interfaces implemented at the RECs and REs. As a particular but non-limiting advantage, certain embodiments of the present invention transmit the CPRI clock signal from the REC side in a separate Ethernet flow, recover the CPRI clock at the RE side, and use the recovered clock to synchronize the RE and RE-side adaptor to the REC's CPRI timing.

Non-limiting examples among the additional advantages provided by the present invention include compatibility with multi-hop asynchronous communication links, the ability of REC/RE packet flows to coexist with other traffic flowing on an asynchronous communication link, and the aggregation of multiple, uncoordinated CPRI links over a single Ethernet link (i.e., multiple uncoordinated pairs of data and synchronization packet flows between RECs and REs can be carried over the same asynchronous communication link). In one advantageous aspect, the approach embodied in the present invention allows inexpensive, asynchronous communication links, such as asynchronous Ethernet, to be used between an REC and an RE.

With the above non-limiting features and advantages in mind, one embodiment of the present invention comprises a method of synchronizing asynchronously distributed downlink data for transmission by an item of radio equipment. The method is implemented, for example, in an apparatus on the RE side that is referred to as an "asynchronous-to-synchronous adaptor," and it includes receiving an asynchronous downlink packet data flow comprising downlink packets, each such packet encapsulating a number of CPRI basic frames, where the CPRI basic frames include CPRI control information and baseband samples representing downlink data to be transmitted from the RE according to precise radio network timing, along with "supplemental" synchronization information used by the RE-side adaptor to re-establish timing synchronization for the CPRI basic frames extracted from the downlink packet flow.

More particularly, the apparatus, also referred to as the RE-side adaptor, restores precise CPRI timing synchronization for the CPRI basic frames extracted from the downlink packet flow by exchanging CPRI synchronization data via a bi-directional synchronization packet flow carried over the asynchronous communication link. The RE-side adaptor uses the CPRI synchronization data to maintain a local CPRI clock synchronized to the REC's CPRI timing. In turn, the RE-side adaptor determines the actual delay incurred by the downlink packets during their transport over the asynchronous communication link, and uses that knowledge and the local CPRI clock to convert the variable transport delay of the asynchronous communication link to a fixed delay value. Further, the RE-side adaptor uses its local CPRI clock to clock the CPRI basic frames recovered from the asynchronous downlink packets to the RE in a CPRI-compliant synchronous stream.

According to such operation, the CPRI basic frames recovered from the downlink packet flow are buffered in transmit order within a synchronization buffer that is clocked as a function of the local CPRI clock. Such buffering includes placing the received CPRI basic frames into buffer positions that impose buffer residency times on the buffered CPRI basic frames that add to their variable link delays to yield a defined static link delay common to all CPRI basic frames at a sequential output of the synchronization buffer. As an example, one may regard the synchronization buffer as an overall series of bins, where data placed in a given bin is clocked successively toward the buffer output one bin at a time. Thus, the time any inserted data item remains within the buffer is determined by the insertion point and the rate of the clock used to clock data out from the buffer. Put another way, the buffer residency time imposed on a given CPRI basic frame is chosen by inserting it into the bin having the desired bin distance from the buffer output.

Correspondingly, the method further includes clocking the CPRI basic frames sequentially out from the synchronization buffer as a function of the local CPRI clock, for synchronous transfer to the RE, for downlink transmission. In one embodiment, CPRI basic frames clocked out from the synchronization buffer are sent via a synchronous CPRI-based link between the apparatus and the RE.

In the uplink direction, the RE-side adaptor receives a CPRI-compliant synchronous stream of CPRI basic frames from the RE, where those CPRI basic frames include CPRI control information and baseband samples representing uplink data received from given ones of the UEs being supported by the RE. The RE-side adaptor encapsulates the CPRI basic frames into uplink data packets and sends them in an asynchronous uplink packet flow supported by the asynchronous communication link.

In another embodiment of the present invention, a method of asynchronously distributing downlink data for synchronized transmission by an item of radio equipment is implemented in a synchronous-to-asynchronous adaptor associated with the REC. This embodiment may be regarded as a complement of the RE-side method described above, which reconstituted the synchronous, CPRI-compliant stream at the RE. Accordingly, the REC-side method includes receiving the (downlink) CPRI basic frames from the REC over a synchronous, CPRI-compliant link, along with CPRI timing, e.g., the REC's master CPRI clock signal. The method further includes grouping the CPRI basic frames, along with supplemental synchronization information for each such group, e.g., a CPRI timestamp referenced to one of the CPRI basic frames in each group. In one or more embodiments, the CPRI timestamp comprises or otherwise includes the CPRI Basic Frame Number (CBFN) of one of the CPRI basic frames included in the group, or a Tchip count value for one of the included CPRI basic frames.

The groups and their corresponding supplemental synchronization information are encapsulated or otherwise packaged into downlink packets for asynchronous transport and sent to an asynchronous-to-synchronous adaptor at the radio equipment (the RE-side adaptor), in a downlink packet flow carried over the asynchronous communication link.

The method further includes exchanging CPRI timing information with the RE-side adaptor via a synchronization packet flow carried on the asynchronous communication link. For example, the REC-side adaptor is configured to establish the synchronization packet flow as an IEEE 1588-based master/slave clock synchronization flow, to extend the precise CPRI timing of the REC to the RE-side adaptor and, in turn, to the RE.

The above approach allows the REC to output the downlink data as a synchronous, CPRI-compliant stream that is encapsulated by the REC-side adaptor into asynchronously transmitted packets carried over the asynchronous communication link in the downlink packet flow. As such, in one REC-side embodiment, an apparatus is configured to operate as a synchronous-to-asynchronous adaptor for asynchronously distributing downlink data for synchronized transmission by a RE. In the uplink direction, the REC-side apparatus receives uplink data packets transmitted asynchronously by the RE-side adaptor over the asynchronous communication link, extracts the CPRI basic frames encapsulated in those uplink data packets and buffers them according to dynamically varied buffer residency times, to compensate for the variable delay of the asynchronous communication link and to thereby provide the (uplink) CPRI basic frames to the REC in a synchronous, CPRI-compliant stream.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a logic flow diagram of one embodiment of a method implemented at a RE-side adaptor, for receiving downlink data in a downlink packet flow over an asynchronous communication link.

FIGS. 5 and 6 are diagrams illustrating example packet flows over an asynchronous communication link, including a first packet flow (FIG. 5) for Common Public Radio Interface (CPRI) basic frames representing downlink data, and a second packet flow (FIG. 6) carrying CPRI synchronization data.

FIG. 7 is a block diagram of one embodiment of a RE-side adaptor, configured for receiving downlink data over an asynchronous communication link and sending uplink data over that link.

FIG. 8 is a logic flow diagram of one embodiment of a method implemented at a REC-side adaptor, for sending downlink data over an asynchronous communication link.

DETAILED DESCRIPTION

Figure 1:
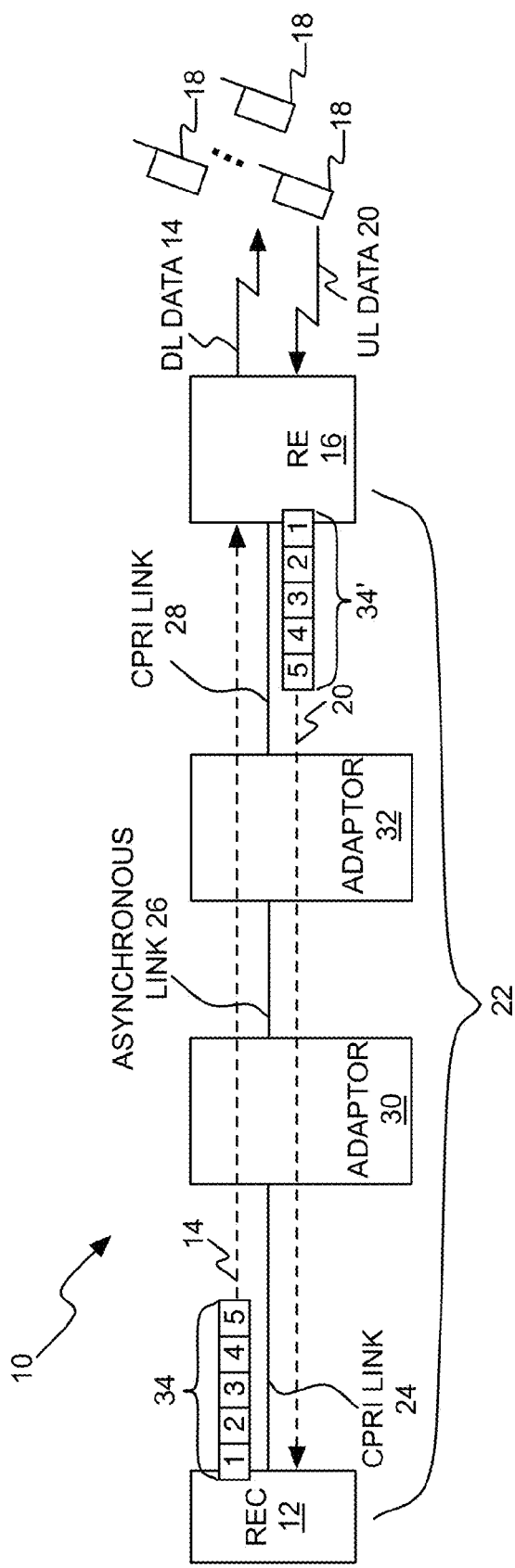
FIG. 1 is a block diagram of one embodiment of a wireless communication network, including a radio equipment controller (REC) and an item of radio equipment (RE), along with adaptors that communicatively couple the REC to the RE over an asynchronous communication link.

FIG. 1 at least partially illustrates a wireless communication network 10, such as a WCDMA- or LTE-based cellular communication network. A Radio Equipment Controller (REC) 12 sends downlink (DL) data 14 for transmission by an item of Radio Equipment (RE) 16 to one or more items of user equipment 18. The term "user equipment" broadly refers to essentially any type of wireless communication device, including but not limited to cellular telephones (smartphones and feature phones), pagers, modems and network adaptors, wirelessly-linked computers, tablets, etc. For ease of reference, "user equipment" is abbreviated as "UE" in singular form and as "UEs" in plural form. The RE 16 also receives uplink (UL) data 20 from UEs 18 and sends that data to the REC 12.

An "overall" communication link 22 between the REC 12 and the RE 16 provides for the transfer of the DL 14 from the REC 12 to the RE 16 and UL data 20 from the RE 16 to the REC 12. As illustrated, the overall link 22 includes a Common Public Radio Interface (CPRI) link 24, which operates as a synchronous, CPRI-compliant link, an asynchronous communication link 26, and a second CPRI link 28. The included asynchronous communication link 26 is economical and easily implemented but disadvantageously transports the DL and UL data 14 and 20 asynchronously and with a variable link delay.

The CPRI protocol cannot tolerate the delay variations typical of asynchronous transport and, to that end, a first apparatus, referred to as "adaptor 30," provides an interface on the REC side between the first CPRI link 24 and the asynchronous communication link 26. Similarly, a second apparatus, referred to as "adaptor 32" provides an interface on the RE side between the second CPRI link 28 and the asynchronous communication link 26.

In the downlink direction, the apparatus 30 encapsulates CPRI basic frames from the REC 12—which carry downlink data and CPRI control information—into downlink data packets and sends them asynchronously to the apparatus 32, via the asynchronous communication link 26. The apparatus 32 recovers the CPRI basic frames sent in the downlink direction by the apparatus 30 and uses dynamically-varied buffering times to compensate for the variable transport delay of the asynchronous communication link 26, to thereby restore CPRI-timing synchronization to the recovered CPRI frames, which are then sent by the adaptor 32 to the RE 16 in a synchronous, CPRI-compliant stream.

In the uplink direction, the apparatus 32 encapsulates CPRI basic frames from the RE 16—which carry uplink data and CPRI control information—into uplink data packets and sends them asynchronously to the apparatus 30, via the asynchronous communication link 26. The apparatus 30 recovers the CPRI basic frames sent by the apparatus 32 in the uplink direction and uses dynamically-varied buffering times to compensate for the variable transport delay of the asynchronous communication link 26, to thereby restore CPRI-timing synchronization to the recovered CPRI frames, which are then sent by the adaptor 30 to the REC 12 in a synchronous, CPRI-compliant stream. It should be noted that at the adaptor 32 buffer insertion of the incoming CPRI basic frames 34, frames must be accurate but is not time-critical; whereas extraction of them for synchronous transport to the RE 16 is time-critical and is regulated by the local CPRI clock at the adaptor 32.

By imposing the variable buffering times in the downlink direction at the adaptor 32, the accumulated delay between the REC 12 and the RE 16 in the downlink direction is made static (within some small tolerance). Likewise, the variable buffering times imposed in the uplink direction at the adaptor 30 make the accumulated delay between the RE 16 and the REC 12 in the uplink direction a static value. Correspondingly, such operation establishes a fixed, static value for the overall round-trip delay from the egress point of the REC 12 for CPRI basic frames flowing in the downlink direction to the ingress point of the REC 12 for CPRI basic frames flowing in the uplink direction.

Before delving into substantive details, it is helpful to first consider that the REC 12 includes a CPRI interface that is configured to output CPRI basic frames 34 carrying DL data 14 for transmission by the RE 16 and receive CPRI basic frames 34' carrying UL data 20 from the RE 16. Correspondingly, the RE 16 includes a CPRI interface that is configured to receive the CPRI basic frames 34 originated by the REC 12, and to output the CPRI basic frames 34' used to convey UL data 20 to the REC 12. The REC's CPRI interface is not explicitly shown in the diagram, nor is the RE's CPRI interface, but it will be understood that the REC 12 includes a communication interface that operates in compliance with the CPRI protocol, and that the same is true for the RE 16.

In a conventional CPRI implementation, the REC's CPRI interface would be coupled to the RE's CPRI interface using one or more synchronous links, so that the precise CPRI timing and synchronization is maintained between the REC 12 and RE 16. Not only is that precision and synchronization required by the CPRI protocol, it is the basis for synchronizing the radio-side timing of the RE 16 to the radio network timing of the REC 12. That is, the RE 16 synchronizes its radio transmission and reception operations to the REC timing based on maintaining its CPRI timing in synchronization with the CPRI timing of the REC 12.

Thus, while it is economical and convenient to couple the REC 12 to the RE 16 via the asynchronous communication link 26, it is quite challenging to maintain the required timing synchronization across the asynchronous communication link 26, at least if one does so while still preserving the relative simplicity and flexibility of asynchronous transport over the asynchronous communication link 26. In more detail, the CPRI basic frames 34 egressing from the REC 12 in the downlink direction represent a synchronous, precisely timed stream that among other things carries baseband samples representing the DL data 14 to be transmitted by the RE 16 according to precise radio network timing. As noted, the CPRI timing is tied to the radio network timing of the REC 12, so that the RE 16 can remain synchronized in the radio network sense, assuming that its CPRI timing remains precisely synchronized with the REC's CPRI timing.

A CPRI basic frame structure consists of sixteen words indexed by W=0 . . . 15 where the first word W=0 is used for a control word. The word size depends on the link rate, which is selected as one among a number of predefined values. The link rate defines the CPRI "line bit rate" and these rates are defined to allow easy recovery of the basic "UMTS" chip rate of 3.84 Mbps, so that radio timing can be easily recovered from the CPRI timing. The rate of 1228.8 Mbps is, for example, one of the defined CPRI line rates and that value corresponds to an encoder rate of 122.88 MHz for "8b/10b" encoding. Consequently, the UMTS chip rate can be recovered directly, simply by dividing the line rate of 122.88 MHz by 32.

A UMTS radio frame is ten milliseconds in duration and each such radio frame is identified by a NodeB Frame Number (BFN). Further, each radio frame is divided into 150 hyper frames and each hyper frame is identified by a Hyper Frame Number (HFN). The basic length of a CPRI basic frame is one ("1") Tchip, and 1 Tchip=1/3.84 MHz=260.416667 ns. Consequently, there are 256 CPRI basic frames in a hyper frame (of duration 66.67 μs). Not to be confused with the UMTS radio frame number (BFN), each CPRI basic frame has an identifying CPRI basic frame number, which is denominated herein for clarity as "CBFN." That is, the term "BFN" indicates the NodeB Frame Number, while "CBFN" indicates the basic frame number of CPRI basic frames.

Those familiar with CPRI operation will appreciate that the REC 12 sends CPRI basic frames 34 to the RE 16 in the downlink direction to convey downlink data to the RE 16, and that the RE 16 sends CPRI basic frames 34' to the REC 12 in the uplink direction to convey uplink data to the REC 12. In terms of relative timing, each CPRI basic frame 34' sent from the RE 16 to the REC 12 in the uplink direction corresponds to one of the CPRI basic frames 34 sent from the REC 12 to the RE 16 in the downlink direction. Indeed, each CPRI basic frame 34 sent in the DL direction has an assigned CBFN and the corresponding CPRI basic frame 34' sent in the UL direction uses the same CBFN. In this regard, CPRI basic frames 34 flow in the downlink direction and are "returned" on a one-for-one basis as CPRI basic frames 34' flowing in the uplink direction.

This "return" feature allows the REC 12 to track the overall round trip time (RTT) between sending a given-numbered CPRI basic frame 34 in the downlink direction and receiving the same-numbered CPRI basic frame 34' in the uplink direction. For CPRI to work, the overall round trip time must be constant within an allowable jitter range. More particularly, there must be a constant and static delay between the REC 12 and the RE 16 to maintain downlink synchronization, and the UL propagation delay must likewise remain static for proper processing of UL data received at the REC 12.

In this regard, FIG. 1 illustrates simplified, example numbering of CPRI basic frames 34 flowing in the downlink direction, e.g., where a handful of consecutive CPRI basic frames 34 are shown as CPRI basic frames 1, 2, 3, 4, and 5. These are not literal CBFN values, but do illustrate the frame numbering operation. On the return portion of the overall downlink/uplink loop, one sees the same-numbered CPRI basic frames 34'. Thus, the CPRI basic frames 34 can be regarded as information "buckets" that, on the downlink, carry CPRI control information and baseband sample data representing DL data 14 to be transmitted from the RE 16 to targeted ones of the UEs 18. These same information buckets are returned as CPRI basic frames 34' flowing in the UL direction. However, while the UL-direction CPRI basic frames 34' have the same numbering as the downlink-direction CPRI basic frames 34, it will be understood that the CPRI basic frames 34' carry CPRI control information and baseband sample data representing UL data received at the RE 16 from the UEs 18.

Treating the downlink direction in detail, CPRI basic frames 34 egress the REC 12 in transmit order and according to precise CPRI timing. The adaptor 30 synchronously receives the CPRI basic frames 34 and CPRI timing information via the synchronous link 24, which effectively extends the CPRI clock domain of the REC 12 to the adaptor 30. The adaptor 30 encapsulates or otherwise packages the CPRI basic frames 34 into asynchronous downlink packets (e.g., Ethernet packets), for asynchronous transmission to the adaptor 32 over the asynchronous communication link 26. These asynchronous downlink packets also may be referred to as asynchronous downlink frames and the terms "packet" and "frame" are used interchangeably for asynchronous transfer on the link 26 unless otherwise indicated.

Each asynchronous downlink packet includes a defined number of CPRI basic frames 34 taken in proper transmit order, along with certain supplemental synchronization information. The supplemental synchronization information is not to be confused with the CPRI clock signal. In a particular example, the supplemental synchronization information placed into each asynchronous downlink packet comprises a CPRI timestamp for a given one of the CPRI basic frames packaged into that asynchronous downlink packet For example, the supplemental synchronization information comprises a CPRI timestamp for the "first" CPRI basic frame 34 included in the asynchronous frame, along with the CBFN identifying the CPRI basic frame 34 to which the timestamp corresponds. Further, in at least one embodiment, each asynchronous downlink packet includes the BFN and HFN of the radio frame(s) applicable to the CPRI basic frames 34 that are included in the asynchronous downlink packet.

The adaptor 32 receives these asynchronous downlink packets and extracts from them the included CPRI basic frames 34. Those CPRI basic frames 34 are placed in proper order, which in at least one embodiment includes recognizing and adjusting for lost or out-of-order asynchronous downlink packets as recognized by the adaptor 32 from the BFN/HFN information included in the supplemental timing information included in the asynchronous downlink packets. That is, the adaptor 32 recognizes missing or out-of-order asynchronous downlink packets from the BFN/HFN values included in the asynchronous downlink packets. Further, in at least one embodiment, the adaptor 32 synthesizes or otherwise generates downlink data and/or CPRI control information for missing or excessively delayed CPRI basic frames 34. In any case, the adaptor 32 extracts the CPRI basic frames 34 and provides them to the RE 16 in a synchronous, CPRI-compliant stream that is output from the adaptor 32 on the synchronous link 28 that interconnects the adaptor 32 to the RE 16.

In the opposite direction, i.e., in the uplink (UL) direction, CPRI basic frames 34' flow from the RE 16 to the REC 12, first over the synchronous CPRI link 28 between the RE 16 and the adaptor 32, then over the asynchronous communication link 26 as asynchronous uplink packets. In the UL direction, the CPRI basic frames 34' carry CPRI control information and UL data received from various ones of the UEs. In this regard, it will be appreciated that the adaptor 32 encapsulates the CPRI basic frames 34' into asynchronous uplink packets for transport to the adaptor 30 over the asynchronous communication link 26. For example, the adaptor 32 "packages" an integer number k CPRI basic frames 34' into each asynchronous uplink packet.

In turn, the adaptor 30 receives the asynchronous uplink packets and extracts their included CPRI basic frames 34'. As done in the downlink direction at the adaptor 30 for the CPRI basic frames 34, the adaptor 30 applies a dynamically varying buffer time to the CPRI basic frames 34' extracted from the received asynchronous uplink packets, to compensate for the variable transport delay of the asynchronous communication link 26. For example, to impose a targeted static transport delay, the adaptor 30 determines the transport delay experienced by a given asynchronous uplink packet in its transport over the asynchronous communication link 26 and shortens or lengthens the buffer residency time of the included CPRI basic frames 34', to achieve the desired static delay value as the sum of the asynchronous communication link transport delay and the buffer residency time.

Thus, referring to the broad example of FIG. 1, the REC 12 sends CPRI basic frames 34 over the synchronous CPRI link 24. The adaptor 30, which includes its own CPRI interface, receives these CPRI basic frames 34 and "packages" them into packets for transport in an asynchronous packet flow over the asynchronous communication link 24. In turn, the adaptor 32 receives the asynchronous packet flow and recovers the CPRI basic frames 34, for synchronous delivery over the synchronous CPRI link 28 between the adaptor 32 and the RE 16. The RE 16 then generates radio signals for transmission, based on DL data included in the CPRI basic frames 34 it receives in the DL direction over the CPRI link 28.

Further, the RE 16 "reuses" those CPRI basic frames 34 for transporting to the REC 12 the UL data received by the RE 16 from UEs 18. In particular, the RE 16 synchronously returns the CPRI basic frames 34 it receives in the DL direction as CPRI basic frames 34' sent in the UL direction. As part of that process, the RE 16 includes UL data from the UEs 18 and CPRI control information in the CPRI basic frames 34' that it sends synchronously to the adaptor 32 over the CPRI link 28.

In turn, the adaptor 32 "packages" the CPRI basic frames 34' into an asynchronous packet flow sent in the UL direction over the asynchronous communication link 26. The adaptor 30 receives the asynchronous packet flow and extracts the CPRI basic frames 34' from it, and then provides those CPRI basic frames 34' to the REC 12 in synchronous fashion, over the CPRI link 26.

Advantageously, the adaptors 30 and 32 may be understood as reconstituting the synchronous DL and UL data streams flowing between the REC 12 and the RE 16, so that the RE 16 transmits the DL data 14 in synchronization with the precise radio network timing maintained at the REC 12, and so that the REC 12 receives the UL data 20 in synchronization with that same timing. In a particular aspect of this advantageous operation, the CPRI basic frames 34 (or 34') and the associated CPRI timing information are sent in separate, independent packet flows over the asynchronous communication link 26.

Figure 2:
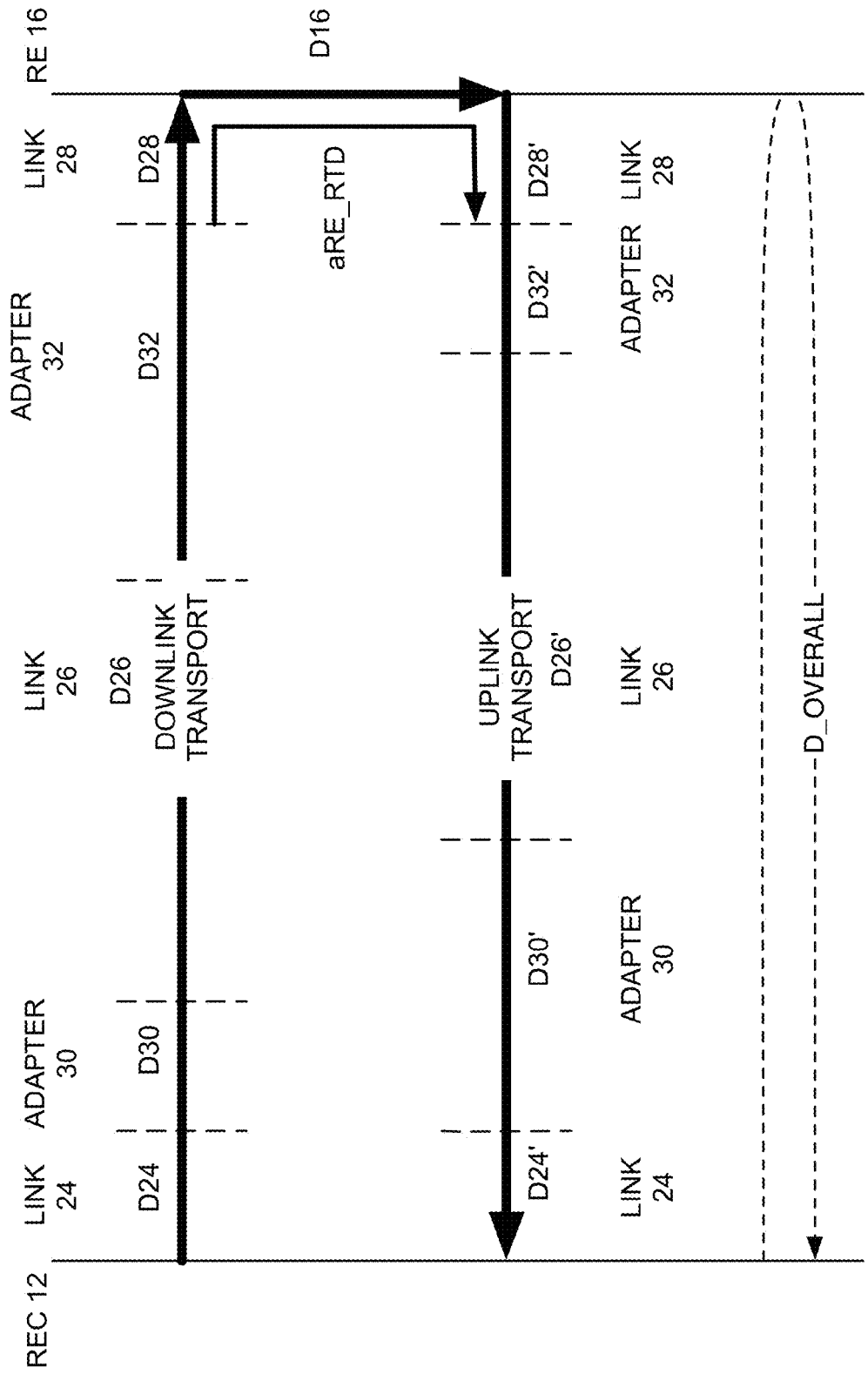
FIG. 2 is a diagram of the aggregate round-trip delay (overall delay) associated with the overall link between the REC and the RE of FIG. 1, including a depiction of individual link delays in the uplink and downlink directions.

To better understand this advantageous approach, FIG. 2 illustrates one aspect of maintaining the requisite radio network timing across the asynchronous communication link 26, despite the potentially large variation in the link delay experienced by data transported over the asynchronous communication link 26. In particular, the disclosed operation of the adaptors 30 and 32 maintain an overall delay (D_OVERALL) at a static, fixed value. Here, D_OVERALL represents the round trip from the REC 12 towards the RE 16 in the downlink direction, and back in the uplink direction, from the RE 16 to the REC 12.

By making the overall delay constant (plus or minus relatively small variations explained later), the one-way UL and DL transport times and the round-trip times over the overall link 22 are made constant (within a minor and allowable range of jitter), which allows the adaptor 32 to provide the RE 16 with the DL data 14 as a synchronous, correctly timed CPRI-compliant stream. Similarly, this arrangement allows the adaptor 30 to provide the REC 12 with the UL data 20 as a synchronous, correctly timed CPRI-compliant stream.

In one or more embodiments, the UL and DL transport times are the same (symmetrical). In one or more other embodiments, the UL and DL transport times are not the same, although they are still held constant. As will be explained below, in at least one embodiment, maintaining overall DL and UL symmetry depends on the adaptor 32 determining the "round-trip delay" (denoted as "aRE_RTD") observed at the adaptor 32 between CPRI basic frames 34 exiting it in the downlink direction toward the RE 16 and the corresponding CPRI basic frames 34' incoming to the adaptor 32 from the RE 16 in the uplink direction. The adaptor 32 provides aRE_RTD delay information in the uplink direction, for use by adaptor 30 in timing the egress of CPRI basic frames 34' from the adaptor 30 toward the REC 12. That is, the aRE_RTD value is accounted for at the adaptor 30, so that the overall UL delay can be made equal to the overall DL delay.

Delay illustrations shown in FIG. 2 help provide a better understanding of these capabilities. Delay values are labeled using a "D" prefix. For example, D24 indicates the delay of link 24, and D26 indicates the delay of link 26. One sees various such labels along the DL direction and substantially similar labels along the UL direction, except that for clarity uplink delays are listed using the prime or accent symbol "'". For example D26' indicates the delay associated with the asynchronous communication link 26 in the uplink direction, while D26 indicates the delay for that link in the downlink direction.

The notation is not meant to indicate that the delays in the DL and UL directions are necessarily different for the same link (although they may be), but rather to emphasize that the overall delay "D_OVERALL" represents the aggregate accumulation of delays from the REC's egress point in the DL direction on link 24, all the way to and through the RE 16, and back to the REC's ingress point in the UL direction on link 24. In this regard, it will be understood that the REC's egress point represents the interface point at which CPRI basic frames 34 are sent in the DL direction from the REC 12, while the REC's ingress point represents the interface point at which CPRI basic frames 34' are received in the UL direction at the REC 12.

Notably, the delay(s) D26/D26' of the asynchronous communication link 26 are subject to significant variation. However, the adaptors 30 and 32 dynamically detect and compensate for the variable transport delay of the link 26 in the DL and UL directions, based on the innovative CPRI time stamping taught herein for the CPRI basic frames 34/34', in conjunction with use of a separate packet flow for the CPRI synchronization information exchanged between the adaptors 30 and 32 over the asynchronous communication link 26. Such adaptations make the overall delay D_OVERALL constant (except for variations in aRE_RTD at the RE 16 and in the CPRI links 24 and 28, where aRE_RTD represents a local "round-trip delay" at the RE 16, and where these variations are very low compared to the CPRI standard requirement of overall round trip delay accuracy of +/−Tc/16, where Tc, also referred to as Tchip, is the duration of a single CPRI basic frame 34/34').

Figure 3:
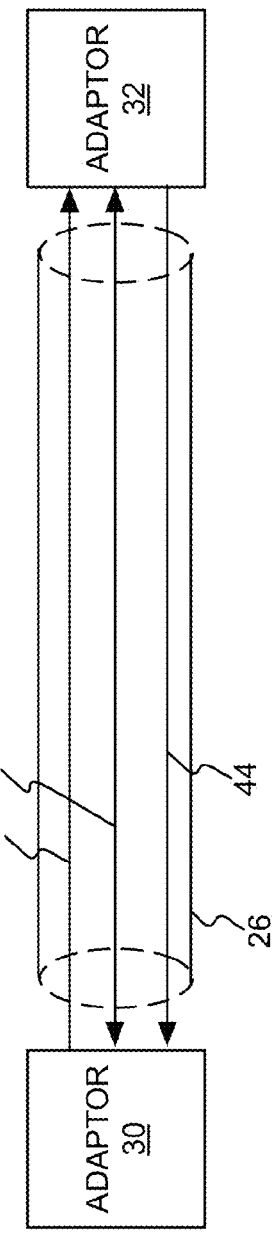
FIG. 3 is a diagram of the unidirectional packet flows used to send downlink and uplink data between an REC and an RE over an asynchronous communication link, and of the separate, bi-directional packet flow used to send synchronization information, e.g., Common Public Radio Interface (CPRI) timing information, over the same asynchronous communication link.

With the noted link and processing delays in mind, FIG. 3 illustrates an example embodiment for implementing the above transports of DL data 14 and UL data 20 over the asynchronous communication link 26. The adaptor 30 receives the DL data 14 from the REC 12 in CPRI basic frames 34 that are synchronously streamed from the REC 12 to the adaptor 30 over the CPRI link 24. That is, operation of the adaptor 30 (and, downstream, the adaptor 32) make the asynchronous communication link 26 transparent to the REC 12 and allow its output interface towards the RE 16 to operate as a standard CPRI-based interface. (Note that the same principles and benefits apply to the RE 16 with respect to UL data 20 sent toward the REC 12, by virtue of the adaptor 32 and the upstream adaptor 30.)

In a notable aspect captured in FIG. 3, the adaptor 30 supports multiple "packet flows" over the asynchronous communication link 26, including packet flows 40, 42, and 44. The packet flow labeled 40 is a first, unidirectional packet flow that is referred to as the downlink packet flow 40, and it comprises asynchronous downlink packets or frames that encapsulate the CPRI basic frames 34 received from the REC 12, for transport in the DL direction toward the RE 16.

The packet flow labeled 42 is a second packet flow between the adaptors 30 and 32. This second packet flow 42 is separate from the downlink packet flow 40, and it is a bidirectional packet flow that enables the adaptor 32 and RE 16 to synchronize their CPRI timing with that of the REC 12 and adaptor 30. For clarity, the second packet flow 42 is referred to as the synchronization packet flow 42.

The packet flow labeled 44 is a third packet flow between the adaptors 30 and 32. Like the downlink packet flow 40, the packet flow 44 is a unidirectional packet flow but it is used to carry CPRI basic frames 34' in the UL direction from the RE 16 to the REC 12. Thus, the packet flow 44 is referred to as the uplink or Uplink packet flow 44 and it will be understood as comprising uplink packets or frames sent asynchronously over the asynchronous communication link 26, where those asynchronous packets encapsulate the CPRI basic frames 34' that carry UL data and CPRI control information from the RE 16.

In one or more embodiments, the synchronization packet flow 42 is an IEEE 1588 clock flow that provides clock information for a master CPRI clock associated with the REC 12/adaptor 30. Providing the synchronization information as a separate flow advantageously allows the downlink packet flow 40 to be constructed from a standard, CPRI-compliant synchronous stream from the REC 12, which includes the CPRI basic frames 34, which carry baseband samples and/or CPRI overhead information. More generally, use of the synchronization packet flow 42 allows the DL and UL packet flows 40 and 44 to be independent of the CPRI synchronization information flowing bi-directionally between the adaptors 30 and 32. Such partitioning of the packet flows offers a number of advantages, including facilitating the use of IEEE 1588 protocols for CPRI timing synchronization between the REC 12/adaptor 30 and the RE 16/adaptor 32.

FIG. 4 illustrates a method 100 of synchronizing asynchronously distributed downlink data for transmission by an item of radio equipment. Using the previously described illustrations for example context, the method 100 is implemented in the adaptor 32 at the RE side, where that adaptor operates in the downlink direction as an asynchronous-to-synchronous adaptor associated with the RE 16. As those skilled in the art will recognize, the order of the method is not limited to that suggested by the flow diagram shown in FIG. 4. One or more of the illustrated steps of the method 100 can be carried out in a different order and/or parts of the method may be carried out in parallel. Further, the method 100 may be performed as part of a larger series or set of operations at the adaptor 32, and other operations may be ongoing or done as needed, such as data processing and packet flow generation in the uplink direction for the uplink packet flow 44, which is not illustrated in FIG. 4.

Moreover, it will be understood that the adaptor 32 comprises certain communication and processing circuits. Those circuits may be fixed hardware or programmable processing circuitry that is specially adapted according to the teachings herein by way of program instruction execution, or such circuits may comprise some mix of fixed and programmable circuitry. In at least one embodiment, the adaptor 32 includes one or more programmable digital processing circuits (e.g., microprocessor, digital signal processor, FPGA, ASIC, etc.) and memory or other storage device storing a computer program comprising program instructions, the execution of which by the adaptor 32 configures it in whole or in part to carry out the method 100.

With the above variability in method flow and processing implementation in mind, the method 100 "begins" with the adaptor 32 generating a local CPRI clock based on exchanging CPRI synchronization data over an asynchronous communication link (Block 102). The method 100 continues with receiving DL data 14 in CPRI basic frames 34 sent over the asynchronous communication link (Block 104).

Still further, the method 100 includes buffering the received CPRI basic frames 34, including imposing variable buffer residency times on the CPRI basic frames 34, to make a fixed delay (Block 106)—e.g., the adaptor 32 imposes buffer residency times that combine with the varying transport delay of the asynchronous communication link 26, such that the combination of delays imposed by the asynchronous communication link 26 and buffering sum to a desired fixed delay value.

With the above compensation applied to effectively "remove" the delay variability of the asynchronous communication link 26, the method 100 continues with clocking the CPRI basic frames 34 sequentially out from the buffer, for synchronous transfer to the RE 16 (Block 108). For example, the adaptor 32 provides the RE 16 with a synchronous, CPRI-compliant stream of CPRI basic frames 34 over the synchronous communication link 28.

The buffering operation for CPRI basic frames 34 at the adaptor 32 includes placing the received CPRI basic frames 34 into buffer positions that impose buffer residency times on the buffered CPRI basic frames 34 that add to their variable link delays to yield a defined static link delay common to all CPRI basic frames at a sequential output of the synchronization buffer. Referring momentarily back to FIG. 2, the buffering may be understood as inversely varying the delay D32 imposed by the adaptor 32 on DL data 14, as a function of the variable link delay D26.

Such operation allows the buffered CPRI basic frames 34 to be synchronously clocked out from the synchronization buffer of the adaptor 32 at a fixed delay and in their buffered sequence order. In this manner, the CPRI basic frames 34 clocked out from the adaptor 32 arrive at the RE's ingress point for downlink data with a fixed delay relative to the REC 12, thereby masking the variable transport delay of the asynchronous communication link 26.

A clarifying note may be in order: in FIG. 1 and elsewhere, the DL data 14 is shown as flowing on the overall link 22 and is shown as being transmitted over-the-air by the RE 16. Such illustration is not meant to imply that the DL data 14 is conveyed in the identical format across the different links; rather, the illustration merely emphasizes that the underlying DL data 14 is conveyed from the RE 12 to the RE 16 for synchronized radio transmission to the UEs 18. For example, in one embodiment, the REC 12 provides downlink data for RE transmission by synchronously sending CPRI basic frames 34 in accordance with the CPRI protocols, and the adaptor 30 encapsulates or otherwise "packages" those CPRI basic frames 34 into asynchronous packets or frames which are then conveyed asynchronously over the asynchronous communication link 26, for recovery/extraction by the adaptor 32. In turn, the adaptor 32 provides those CPRI basic frames 34 to RE 16 in a CPRI-compliant synchronous stream sent over the link 28.

In one embodiment of the method 100, the adaptor 32 receives the CPRI basic frames 34 in a first Ethernet flow—i.e., the asynchronous downlink packet flow 40 is an Ethernet flow and the asynchronous communication link 26 comprises an Ethernet-based link having one or more routing hops. The first Ethernet flow comprises a series of first Ethernet frames each including a number of the CPRI basic frames 34 and supplemental synchronization information as shown and described herein.

Further, in this embodiment, the adaptor 32 generates its local CPRI clock based on exchanging CPRI synchronization data over the asynchronous communication link 26 in a second Ethernet flow that is bi-directional and separate from the first Ethernet flow carrying the DL data 14. This second Ethernet flow comprises a series of second Ethernet frames each including CPRI clock synchronization data to or from the adaptor 32, for use in maintaining clock synchronization with the CPRI timing of the REC 12.

Refer to FIG. 5 for an illustrative example of the first Ethernet flow as a specific example of the downlink packet flow 40. Refer to FIG. 6 for an illustrative example of the second Ethernet flow as a specific example of the synchronization packet flow 42.

In the same embodiment of the method 100, the supplemental synchronization information in each first Ethernet frame of the Downlink packet flow 40 comprises a CPRI timestamp for one of the CPRI basic frames 34 included in that Ethernet frame. The timestamp provides a timing reference expressed, for example, in a Tchip count, that allows the adaptor 32 to know when the CPRI basic frames 34 were packaged into the Ethernet frame by the adaptor 30, for transport over the asynchronous communication link 26. Because the adaptor 32 has its own CPRI clock, which is synchronized to the REC/REC-adaptor timing, it can use the received time for the Ethernet frame and the included CPRI timestamp to determine the transport delay imposed on the Ethernet frame by the asynchronous communication link 26.

In turn, by knowing the transport delay of the asynchronous communication link 26, the adaptor 32 determines the buffer times needed to compensate for the variable delay of the asynchronous communication link 26. To effect that compensation, the adaptor 32 places individual ones of the received CPRI basic frames 34 into the buffer positions at the adaptor 32, based on determining the variable link delay experienced by the CPRI basic frames 34 included in each first Ethernet frame. For each frame received by the adapter 32 as part of the downlink packet flow 40, this determination can be made using the CPRI timestamp included in that frame by the adaptor 30 as supplemental timing information, and the local CPRI clock maintained at the adaptor 32, which is maintained using the synchronization information exchanged between the adaptors 30 and 32 in the synchronization packet flow 42.

In at least one such embodiment, the supplemental synchronization information in any given first Ethernet frame carried in the downlink packet flow 40 further comprises the BFN and HFN associated with the CPRI basic frames 34 included in the first Ethernet frame, and the CBFN of the first CPRI basic frame included in that given Ethernet frame. Using a predetermined arrangement whereby the included CPRI timestamp is understood by the adaptor 32 as corresponding to the first CPRI basic frame 34 in each first Ethernet frame received in the downlink packet flow 40, the supplemental synchronization information need not include the CBFN identifying to which CPRI basic frame 34 the timestamp corresponds.

Thus, the method 100 includes determining the variable link delay experienced by asynchronous downlink packets conveyed over the asynchronous communication link 26 in the downlink packet data flow, where such determination is made using the CPRI timestamp included in each such packet. For example, the adaptor 32 can use its local, recovered CPRI clock in comparison to the CPRI timestamp included in each asynchronous communication link frame, to determine the variable delay experienced by each asynchronous communication link frame. Note that such a determination may also incorporate known or learned values for any fixed delays at the adaptor 30 associated with encapsulating and sending the CPRI basic frames 34 and/or with processing the received downlink packet frames at the adaptor 32, to extract the encapsulated CPRI basic frames 32.

In at least one embodiment of the method 100, the adaptor 32 maintains its local CPRI clock based on exchanging CPRI synchronization data over the asynchronous communication link 26 according to the IEEE 1588 protocol. That is, the synchronization packet flow 42 comprises an IEEE 1588 clock synchronization flow referenced to a master CPRI clock associated with CPRI synchronization at the REC 12. Whether IEEE 1588-based synchronization is used, in at least one method embodiment, buffering of the CPRI basic frames 34 in transmit order within the synchronization buffer comprises placing the CPRI basic frames into the synchronization buffer at the adaptor 32 in their original order of egress from REC 12.

In this regard, the adaptor 32 is configured to account for any missing or mis-ordered asynchronous packets or frames as received in the Downlink packet flow 40, so that proper CPRI basic frame ordering is preserved across multiple asynchronous downlink packets, as received at the adaptor 32. Further in one or more embodiments, the adaptor 32 is configured to replace any missing (or excessively delayed) CPRI basic frames 34 with synthesized basic frames formed from artificial baseband samples. In this respect, the adaptor 32 uses default or dynamically generated baseband samples to substitute for baseband samples in CPRI basic frames 34 that are impermissibly delayed or outright lost as a consequence of their encapsulated transport over the asynchronous communication link 26. As a non-limiting example, "zero" or null values, or other default values may be used as the substituted baseband samples.

This synthesis and substitution in observance of the correct CPRI basic frame order permits the adaptor 32 to provide the RE 16 with a continuous and synchronous stream of CPRI basic frames 34 containing DL data 14 for downlink transmission by the RE 16 in accordance with the proper synchronous radio network timing. As noted, in at least one embodiment, the adaptor 32 is configured to account for missing CPRI basic frames 34 by inserting into the synchronization buffer, in observance of the transmit order, synthesized baseband data and control information, as needed.

An example apparatus for operation as the above-described adaptor 32 is shown in FIG. 7. More particularly, the adaptor 32 shown in FIG. 7 is configured to operate in the DL direction as an asynchronous-to-synchronous adaptor for synchronizing asynchronously distributed DL data 14, for transmission by the RE 16. According to the non-limiting example illustration, the adaptor 32 includes an asynchronous communication link interface 38 that is configured to generate a local CPRI clock based on exchanging CPRI synchronization data over an asynchronous communication link 26 having a variable link delay, and to further receive the DL data 14 as CPRI basic frames 34 sent over the asynchronous communication link 26, e.g., in a downlink packet flow 40.

In the example illustration, this arrangement is shown as the asynchronous communication link interface 38 supporting the downlink packet flow 40 and the synchronization packet flow 42. The illustration also depicts the asynchronous communication link interface 38 as sending the uplink packet flow 44 over the asynchronous communication link 26, towards the REC 12. In that regard, in the UL direction the adaptor 32 operates as a synchronous-to-asynchronous adaptor, i.e., the adaptor 32 receives UL data 20 on the synchronous, CPRI-compliant link 28 and packages it for asynchronous transport toward the REC 12 via the asynchronous communication link 26.

In correspondence with receiving the synchronization packet flow 42 the asynchronous communication link interface 38 provides a synchronization signal 46 to a clock recovery unit 48 that is configured to generate the aforementioned local CPRI clock, which is slaved to the REC's CPRI clock timing as a function of the CPRI synchronization data exchanged between the adaptors 30 and 32 in the synchronization packet flow 42. In the illustration, the local CPRI clock is represented as a local CPRI clock signal 50.

Similarly, in correspondence with receiving the downlink packet flow 40, the asynchronous communication link interface 38 provides data 52 to a delay management unit 54, where it will be understood that the data 52 represents the CPRI basic frames 34 extracted from the asynchronous packets or frames comprising the Downlink packet flow 40. Consequently, the data 52 may be mis-ordered and there may be missing CPRI basic frames 34 lost or excessively delayed in transit over the asynchronous communication link 26.

To address the delay variability of the asynchronous communication link 26—where that variability potentially far exceeds the permissible end-to-end variation allowable in the CPRI standard for D_OVERALL—the adaptor 32 includes a delay management unit 54 that outputs correctly ordered data 56 to a synchronization buffer 58. The synchronization buffer 58 in turn comprises a sequential series of buffer positions or bins 60.

The synchronization buffer 58 in one or more embodiments comprises a sequential series of buffer positions 60, wherein each buffer position 60 corresponds to a defined buffer residency time. Thus, "buffer depth" denotes the distance in positions or bins 60 from a buffer egress point 64, which provides a synchronous data stream 62 comprising CPRI basic frames 34 sequentially clocked out from the buffer 58. As such, the buffer residency time for any given CPRI basic frame 34 taken from the data 52 by the delay management unit 54 and inserted into the synchronization buffer 58 depends on the depth at which the delay management unit 54 inserts that CPRI basic frame into the synchronization buffer 58.

Figure 15:
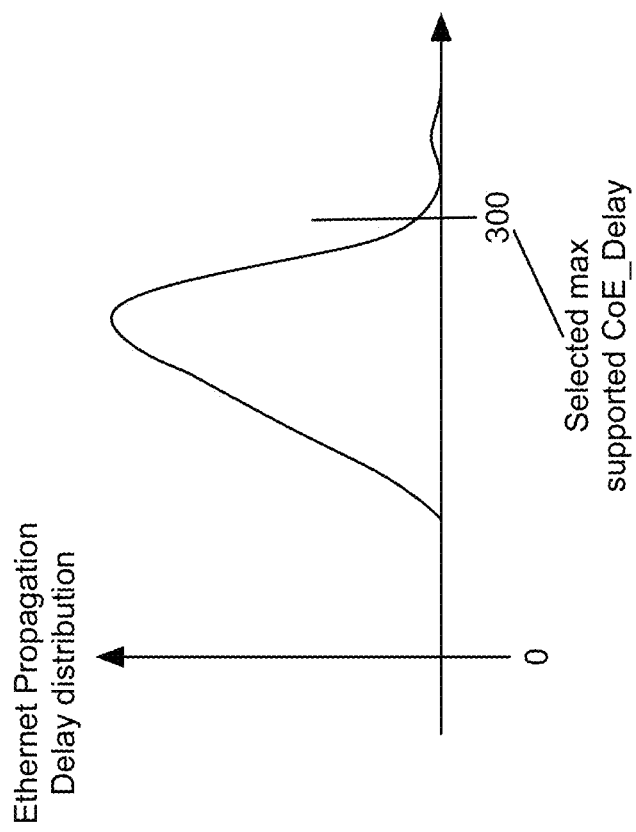
FIG. 15 is a diagram of an example propagation delay distribution for an Ethernet link, and indicates how a maximum buffer residency time may be configured in dependence on that distribution.

The maximum buffer depth—the maximum buffer residency time that may be imposed via buffering in the synchronization buffer 58—may be set according to the known or expected propagation delay distribution of the asynchronous communication link 26. See FIG. 15 momentarily, illustrating an Ethernet-based example where the maximum buffer delay is set at a value that accommodates the expected maximum delay or some large fraction thereof, e.g., 99% of the propagation delay range that is known for or characteristic of the asynchronous communication link 26.

In at least one embodiment, the delay management unit 54 is configured to extract CPRI basic frames 34 from the packets or frames received via the Downlink packet flow 40 and buffer the extracted CPRI basic frames 34 in the synchronization buffer 58 by placing the received CPRI basic frames 34 in transmit order into buffer positions 60 that impose buffer residency times on the CPRI basic frames 34 that add to their variable link delays to yield a defined static link delay common to all CPRI basic frames at the sequential output 64 of the synchronization buffer 58.

For example, a given asynchronous downlink packet received in the downlink packet flow 40 includes some number of CPRI basic frames 34 that have a common accumulated delay experienced in their transit to the adaptor 32. The individual delays contributing to that accumulated delay include the variable delay of the asynchronous communication link 26. Once the adaptor 32 determines that delay value (using the CPRI timestamp included in the received packet or frame and its local, CPRI clock), it determines the starting buffer depth for inserting the first one of the CPRI basic frames 34 included in the received packet. It inserts that first CPRI basic frame 34 into the proper buffer position 60 and further inserts the remaining ones of the CPRI basic frames 34 included in the received packet into successive ones of the buffer positions 60, according to their CPRI basic frame ordering.

Note that the delay management unit 54 includes as part of its buffer insertion process the detection of missing CPRI basic frames and the corresponding generation of substitute CPRI basic frames based on synthesized baseband samples, for insertion into the buffer positions 60 into which the real CPRI basic frames 34 would have been inserted had they not been lost or excessively delayed.

The adaptor 32 further includes a buffer clock unit, which may simply be part of the clock recovery unit 48. This arrangement is configured to clock the CPRI basic frames 34 sequentially out from the synchronization buffer 58 as a function of the local CPRI clock (signal 50). Still further, the adaptor 32 includes a synchronous link interface 68 that provides a synchronous, CPRI-compliant data stream 70 to the RE 16, where that stream 70 corresponds to the stream 62 clocked out from the synchronization buffer 58—i.e., the stream 70 comprises the CPRI basic frames synchronously clocked in correct transmit order from the synchronization buffer 58, for conveyance to the RE 16 via the synchronous link 28. The synchronous link interface 68 is also referred to as a CPRI interface 68, to emphasize that it provides a CPRI-compliant synchronous stream of CPRI basic frames 34 to the RE 16 in the downlink direction (and receives a synchronous stream of CPRI basic frames 34' from the RE 16 in the uplink direction).

As such, the adaptor 32, including the synchronous link interface 68, is configured for synchronous transfer of the CPRI basic frames 34 from the synchronization buffer 58 to the RE 16, for downlink transmission. One also sees that in the reverse (UL) direction the adaptor 32 receives a synchronous, CPRI-compliant stream 72 from the RE 16, which includes CPRI basic frames 34' carrying the UL data 20 to be sent to the REC 12. The synchronous link interface 68 provides a corresponding stream 74 for input to the asynchronous communication link interface 38, which includes an encapsulation unit 76 and a de-capsulation unit 78. The encapsulation unit 76 generates asynchronous communication link packets or frames that encapsulate the CPRI basic frames 34', as received from the RE 16 via the stream 72. In the DL direction, the de-capsulation unit 78 disassembles or otherwise unpacks the asynchronous downlink packets received in the downlink packet flow 40.

For clarity, the CPRI basic frames 34 received asynchronously at the adaptor 32 in the downlink direction may be referred to as "first" CPRI basic frames. As noted, each such asynchronous downlink packet includes a defined number of the first CPRI basic frames and corresponding supplemental synchronization information. The adaptor 32 also receives CPRI basic frames 34' synchronously in the uplink direction from the radio equipment 16. These CPRI basic frames 34' may be referred to as "second" CPRI basic frames carrying uplink data. From the earlier explanations, it will be appreciated that these second CPRI basic frames have CPRI Basic Frame Numbers (CBFNs) corresponding to the CBFNs of the first CPRI basic frames, and that the adaptor 32 is configured to asynchronously transfer the second CPRI basic frames in the uplink direction via the asynchronous communication link 26. It does so by encapsulating the second CPRI basic frames into asynchronous uplink packets, each said asynchronous uplink packet including the supplemental synchronization information received for the corresponding first CPRI basic frames, as modified to include an observed delay between the first CPRI basic frames synchronously sent to the item of radio equipment and the corresponding second CPRI basic frames synchronously received from the item of radio equipment—i.e., to include aRE_RTD.

Continuing with the illustrated details, in at least one embodiment, the asynchronous communication link interface 38 comprises an Ethernet interface, and the adaptor 32 is configured to receive a first Ethernet flow over an Ethernet link having one or more routing hops. As was illustrated in FIG. 5, the first Ethernet flow—e.g., the downlink packet flow 40—comprises a series of first Ethernet frames, each including a number of the CPRI basic frames 34 conveying DL data 14, and each first Ethernet frame further including supplemental synchronization information—e.g., a CPRI timestamp for one of the CPRI basic frames 34 encapsulated within the Ethernet frame. The adaptor 32 is further configured to support a second Ethernet flow over the Ethernet link, where the second Ethernet flow comprises a bidirectional exchange of CPRI clock synchronization data with the adaptor 30. Refer back to FIG. 6 and its example illustration of the synchronization packet flow 42 as this second Ethernet flow.

In at least one embodiment, the supplemental synchronization information in each first Ethernet frame comprises a CPRI timestamp for one of the included CPRI basic frames. The delay management unit 54 is configured to place the received CPRI basic frames 34 into the correct buffer positions 60, based on being configured to determine the variable link delay experienced by the CPRI basic frames 34 included in each first Ethernet frame using the included CPRI timestamp and the local CPRI clock at the adaptor 32.

In one or more embodiments, the supplemental synchronization information in each first Ethernet frame further includes the BFN and HFN associated with the CPRI basic frames 34 included in each first Ethernet frame and a CPRI timestamp for a particular one of the CPRI basic frames 34 included in the first Ethernet frame. The delay management unit 54 is configured to determine a correct ordering of the CPRI basic frames 34 across two or more of the first Ethernet frames based on the HFN and the BFN.

More generally, in at least one embodiment the adaptor 32 is configured to receive asynchronous communication link frames, each comprising a number of CPRI basic frames and a CPRI timestamp for one of the CPRI basic frames included in the asynchronous communication link frame. The delay management unit 54 is configured to determine the variable link delay of each asynchronous communication link frame from the included CPRI timestamp.

The clock recovery unit 48 is configured to generate the local CPRI clock referenced to a master CPRI clock associated with CPRI synchronization at the REC 12. To establish and maintain such synchronization, in one or more embodiments, the synchronization packet flow 42 is a bi-directional, second Ethernet flow configured as a IEEE 1588 clock synchronization packet flow that is used by the adaptor 32 to slave its local CPRI clock to the CPRI clock timing of the REC 12.

Further, the delay management unit 54 in one or more embodiments is configured to buffer the CPRI basic 34 frames in their CPRI transmit order within the synchronization buffer 58 by arranging the CPRI basic frames 34 in their original order of egress from the REC 12, and replacing any missing CPRI basic frames with synthesized basic frames formed from, e.g., artificial baseband samples and synthesized control data, as needed. Stated broadly, in at least one embodiment, the delay management unit 54 is configured to detect missing CPRI basic frames 34 and to account for them by inserting into the synchronization buffer 58, on an as needed basis and in observance of the transmit order, synthesized baseband data and control information.

Turning to the REC side of operations, FIG. 8 illustrates a method 120 on the REC side of asynchronously distributing downlink data for synchronized transmission by an RE, e.g., by the RE 16. The method is implemented in an apparatus configured as a synchronous-to-asynchronous adaptor associated with an REC originating the downlink data. Referring back to the example FIG. 1, the method 120 is implemented in the adaptor 30. As with the method 100 implemented on the RE side, the method 120 may be implemented in a different order than that illustrated. Additionally, or alternatively, portions of the method 120 may be implemented in parallel and/or as part of a larger, overall set of operations at the adaptor 30.

Moreover, it will be understood that the adaptor 30 comprises certain communication and processing circuits. Those circuits may be fixed or programmable, or some mix of fixed and programmable circuitry. In at least one embodiment, the adaptor 30 includes one or more programmable digital processing circuits (e.g., microprocessor, digital signal processor, FPGA, ASCI, etc.) and memory or another storage device holding a computer program comprising program instructions, the execution of which by the adaptor 30 configures it in whole or in part to carry out the method 120.

With the above variability in method flow and processing implementation in mind, the method 120 "begins" with the adaptor 32 establishing or otherwise maintaining a synchronization packet flow 42 over the asynchronous communication link 42 with the RE-side adaptor 30 (Block 122). The method 120 continues with encapsulating CPRI basic frames 34 as received from the REC 12, for transport over the asynchronous communication link 24 (Block 124), and sending encapsulated CPRI basic frames over the asynchronous communication link 26 in a downlink packet flow 40 that is separate from the synchronization packet flow 42 (Block 126)—i.e., the adaptor 30 sends asynchronous downlink packets, each such packet encapsulating a number of the CPRI basic frames 34 received from the REC 12.

Those skilled in the art will further appreciate that, while not illustrated in FIG. 8, the adaptor 30 also receives CPRI basic frames 34' from the RE 16, via the asynchronous communication link 26. That is, the adaptor 30 receives asynchronous uplink packets via the uplink packet flow 44 shown in FIGS. 3 and 7, where each uplink packet encapsulates a number of the CPRI basic frames 34' that are received at the adaptor 32 from the RE 16 and packaged for asynchronous transport in the UL direction over the asynchronous communication link 26. It will therefore be understood that the adaptor 30 includes processing much like that discussed for the adaptor 32 in the DL direction—i.e., the adaptor 30 extracts the CPRI basic frames 34' from the asynchronous uplink packets it receives via the uplink packet flow 44, and buffers them in their correct CPRI number order, using buffer residency times that are dynamically varied on a per-packet basis, to dynamically compensate for the variable transport delay of the asynchronous communication link 26. Such operation allows the adaptor 30 to provide the UL data 20 to the REC 12 in a synchronous, CPRI-compliant stream of extracted CPRI basic frames 34' exiting from the synchronization buffer of adaptor 30 with a fixed delay.

Figure 9:
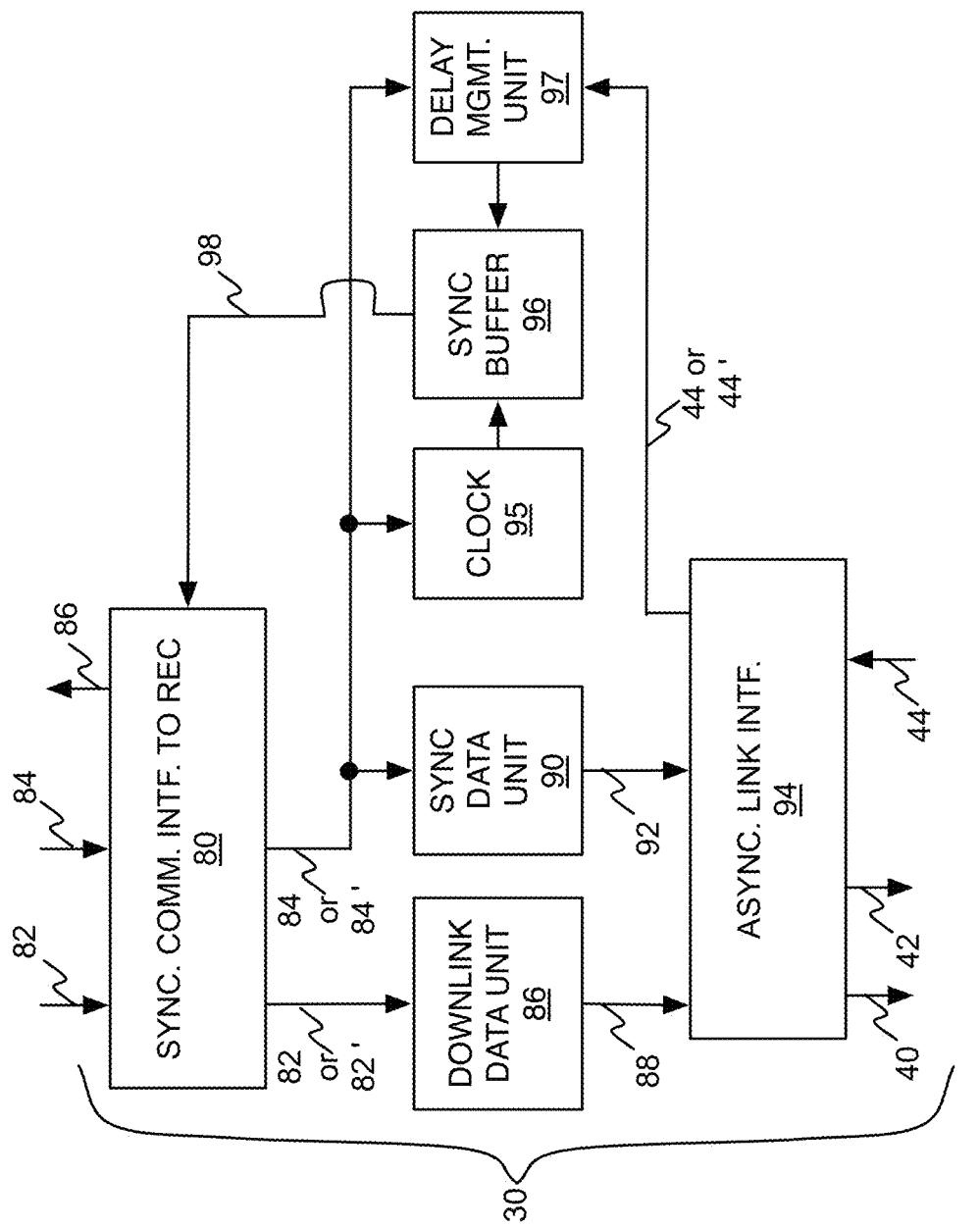
FIG. 9 is a block diagram of one embodiment of an REC-side adaptor, configured for sending downlink data over an asynchronous communication link and receiving uplink data over that link.

FIG. 9 illustrates an apparatus configured to operate as a synchronous-to-asynchronous adaptor for asynchronously distributing downlink data for synchronized transmission by an item of radio equipment. That is, FIG. 9 can be understood as a non-limiting example illustrating the adaptor 30, for sending DL data 14 from the REC 12 over the asynchronous communication link 26 to the adaptor 32, for synchronous delivery to the RE 16.

The illustrated embodiment of the adaptor 30 includes a synchronous communication link interface 80 configured for receiving the DL data 14 as CPRI basic frames 34 in a synchronous stream 82 from the REC 12. The synchronous communication link interface 80 is also configured to receive a CPRI clock signal 84 from the REC 12. One also sees that the synchronous communication link interface 80 is configured to provide the REC 12 with a synchronous, CPRI-compliant stream 86 that includes CPRI basic frames 34' representing the UL data 20 received from the RE 16/adaptor 32 via the asynchronous communication link 26.

The synchronous communication link interface 80 provides the synchronous stream 82 of DL data 14 to a downlink data unit 86, or equivalently provides a stream 82' that is derived from the synchronous stream 82. As an example, the synchronous stream 82 comprises a stream of CPRI basic frames 34. In turn, the downlink data unit 86 assembles the CPRI basic frames 34 and supplemental synchronization information—e.g., it divides the CPRI basic frames 34 into groups of "k" CPRI basic frames 34, where "k" is an integer, and generates a CPRI timestamp for a particular one of the CPRI basic frames 34 included in each group. This grouped data is output in a data stream 88, in proper CPRI order. Notably, each such group of CPRI basic frames 34 has associated therewith one or more items comprising supplemental synchronization information, such as a CPRI timestamp for one of the CPRI basic frames included in the group.

Also, as shown, the synchronous communication link interface 80 provides the CPRI clock signal 84, or a derived clock signal 84', to a synchronization unit 90, for use in maintaining the bi-directional synchronization packet flow 42 with the RE-side adaptor 32, including the generation of synchronization data frames as a data stream 92. An asynchronous communication link interface 94 cooperates with the downlink data unit 86 and with the synchronization unit 90. As regards the downlink data unit 86, the asynchronous communication link interface 94 receives the data stream 88 and forms the previously mentioned downlink packets for asynchronous transport to the adaptor 32 at the RE 16—i.e., as downlink packets flowing over the asynchronous communication link 26 in the downlink packet flow 40. Each such downlink packet encapsulates the CPRI basic frames in one of the groups formed by the downlink data unit 86 and the corresponding supplemental synchronization information, for asynchronous transport over the asynchronous communication link 26.

Further, the asynchronous communication link interface 94 maintains the synchronization packet flow 42 with the adaptor 30, based on receiving the data stream 92, which includes CPRI synchronization information referenced to the CPRI master clock of the REC 12. Note that in one or more embodiments, the synchronization unit 90 and the asynchronous communication link interface 94 cooperate to establish or otherwise maintain the synchronization packet flow 42 as an IEEE 1588 clock synchronization flow. In any case, the asynchronous communication link interface 94 is configured for sending the downlink packets over the asynchronous communication link 26 in the unidirectional downlink packet flow 40, while maintaining the synchronization packet flow 42 as a separate, bi-directional packet flow.

One also sees that the asynchronous communication link interface 94 is configured to provide the received uplink packet flow 44 (or a derived stream of data 44') to a delay management unit 97. In an overall sense, the delay management unit 97 uses a synchronization buffer 96 in much the same manner as the delay management unit 54 uses the synchronization buffer 58 in the adaptor 30 at the RE 16. Thus, CPRI basic frames 34' encapsulated in the uplink packet flow 44 are placed into the synchronization buffer 96 in their correct receive order and at a buffer depth that accounts for the variable delay of the asynchronous communication link 26 in the UL direction. Further, missing data is detected and synthesized data is substituted therefor. In turn, a clock unit 95 synchronously clocks the CPRI basic frames 34' out from the synchronization buffer 96, as a synchronous stream 98 that is provided to the REC 12 by the synchronous communication interface 80 as a synchronous, CPRI-compliant stream 86.

Figure 10:
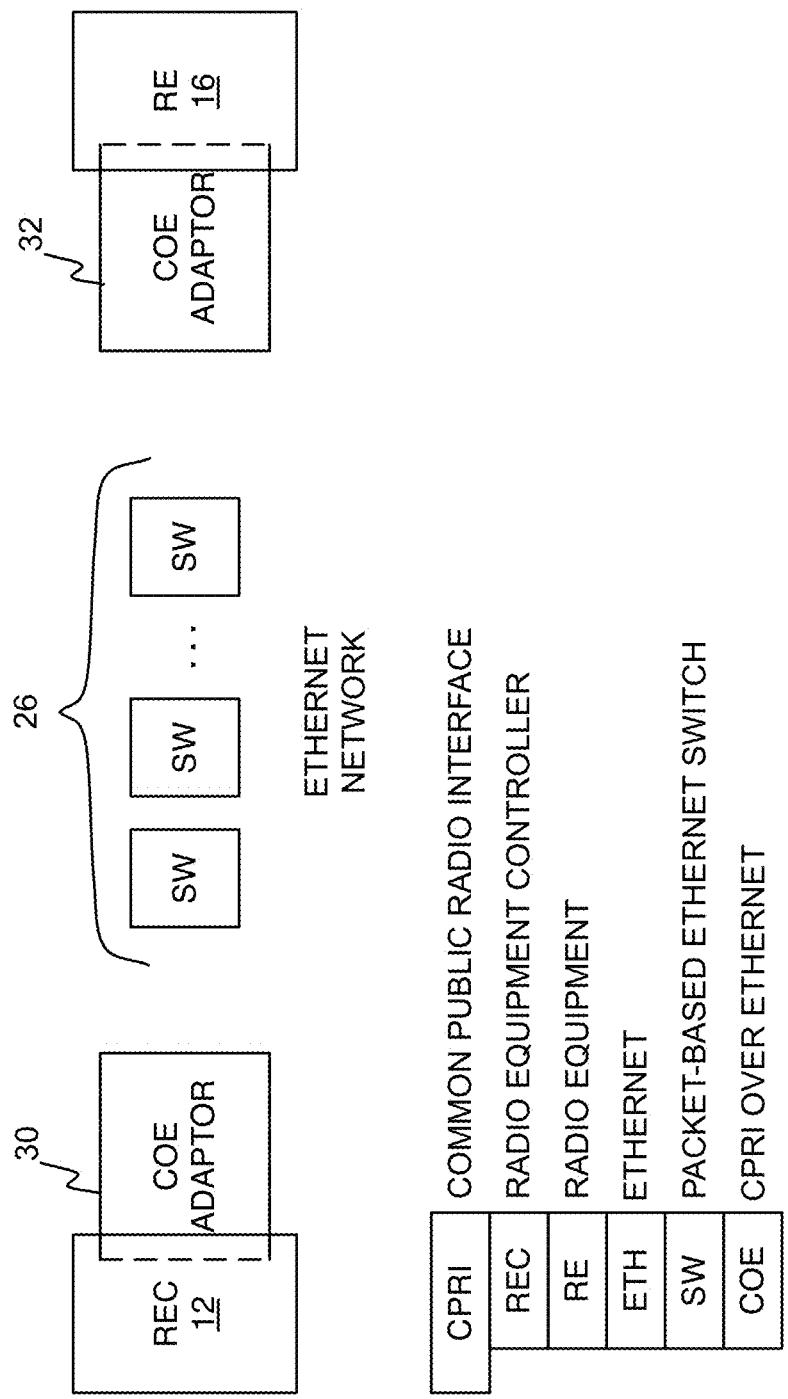
FIG. 10 is a block diagram for an embodiment in which an REC is coupled to an RE over an Ethernet-based link, using an REC-side adaptor and an RE-side adaptor.

Turning to the more explicit Ethernet example of FIG. 10, one sees an overall "system" type depiction where the envisioned system includes the REC-side adaptor 30 and the RE-side adaptor 32. The asynchronous communication link 26 is depicted as a multi-hop Ethernet link comprising a number of routers (SWs in the diagram). The adaptors 30 and 32 may be understood as CPRI-over-Ethernet (CoE) adaptors. The adaptor 30 operates as a synchronous-to-asynchronous adaptor for the DL data 14 and as an asynchronous-to-synchronous adaptor for the UL data 20. Conversely, the adaptor 32 operates as an asynchronous-to-synchronous adaptor for the DL data 14 and as a synchronous-to-asynchronous adaptor for the UL data 20.

Instead of a direct dedicated link between the REC 12 and the RE 16 using the CPRI protocol, an Ethernet link is used with a CoE adaptor at both the REC and RE. The Ethernet link may be shared with other services and may carry other traffic in addition to the downlink packet flow 40, the synchronization packet flow 42, and the uplink packet flow 44. Of course, the Ethernet link must at least be provisioned with sufficient resources (e.g. transport bandwidth) to enable the contemplated CoE application.

The adaptor 30 may be distinct from the REC 12, or may be partially or entirely integrated within the REC 12. Similarly, the adaptor 32 at the RE may be distinct from the RE 16, or may be partially or wholly integrated within the RE 16. Together, the adaptors 30 and 32 provide for implementation of a precision, CPRI-based clock, and mapping of CPRI basic frames 34 in the DL direction to asynchronous packets or frames sent via the Downlink packet flow 40. Likewise, the adaptors 30 and 32 provide for the mapping of the corresponding CPRI basic frames 34' in the UL direction to asynchronous packets or frames sent via the Uplink packet flow 44.

The asynchronous packets or frames carried in the Downlink packet flow 40 and/or in the Uplink packet flow 44 may be referred to herein as "CoE packets." That term connotes the encapsulation of CPRI basic frames 34/34' for transport over the asynchronous communication link 26. In this regard, the adaptors 30 and 32 address impairments of the ingress CoE packets arising from their transport over the asynchronous communication link 26—e.g., missing, out-of-order, or excessively delayed data.

CoE packets arrive asynchronously and some may be missing. The synchronization buffer 58 at the adaptor 32 is used to assemble arriving CoE packets in the order of egress from adaptor 30. CPRI basic frames 34 can be inserted in proper order into the synchronization buffer 58 using the BFN, HFN, and CBFN associated with them (where such data is carried as supplemental synchronization data in asynchronous packets or frames carried in the Downlink packet flow 40. The same applies to the synchronization buffer 96 and CPRI basic frames 34', with respect to CoE packets carrying UL data 20 in the Uplink packet flow 44, which originates from the adaptor 32.

The size of the synchronization buffer 58 or 96 is a notable design criterion and is driven principally by the round-trip latency requirement of the air-interface(s) being supported by the REC 12 and RE 16. While the CoE packets arrive asynchronously at the adaptor 30 (or 32) over the asynchronous communication link 26, they must be delivered into the CPRI interface of the REC 12 (or RE 16) synchronously in order to be transparent to the CPRI interface of the REC 12 (or RE 16). This feature is accomplished by transferring CPRI basic frames 34 (or 34') extracted from the CoE packets into the REC (or RE) CPRI interface at both a precise known latency and at a clocking rate that is regulated by the master CPRI clock of the REC 12, or a clock signal slaved to that master.

Figure 11:
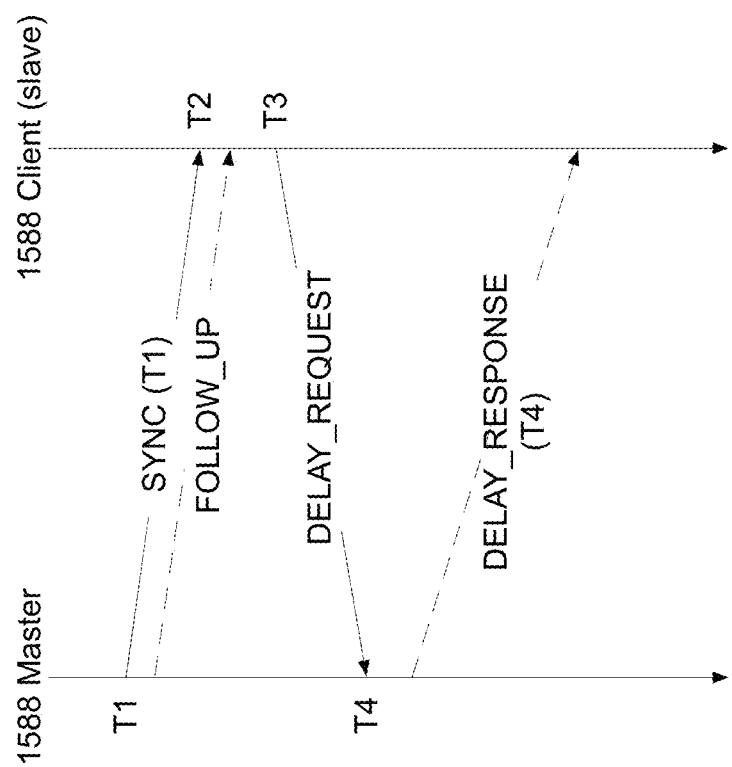
FIG. 11 is a diagram of example clock synchronization over an asynchronous communication link according to the IEEE 1588 protocol.

See, e.g., FIG. 11, where bidirectional communication between an IEEE 1588 "master" and an IEEE 1588 "client" slaves the client's clock to that of the master. It will be understood that the adaptor 30 plays the role of "master" while the adaptor 32 plays the role of "client," and that the bidirectional synchronization packet flow 42 carries the master-client signaling.

Missing or excessively delayed CoE packets at the adaptor 30 or 32 are addressed by synthesizing them at the adaptor 30 or 32. The objective of such synthesis is to make missing CoE packets transparent to the CPRI protocol layer. Each CPRI basic frame 34 or 34' within a CoE packet contains baseband samples and CPRI control data. The synthesized baseband samples can be set to zero; however synthesis of the CPRI control parameters requires more elaborate processing to remain transparent to the CPRI layer. For example, CPRI overhead parameters can be transparently synthesized by inserting one of the following: idle characters, fixed parameters, or counters.

The CPRI clock (the aforementioned synchronization data) is not embedded within the CoE packets carried in the downlink and uplink packet flows 40 and 44, rather it is implemented in a separate Ethernet flow (the synchronization flow 42). This partition makes CPRI clock recovery (transfer) from the REC-side adaptor 30 to the RE-side adaptor 32 achievable using a packet-based method without physical-layer synchronization support. In particular, the implementation can rely on methods such as IEEE 1588. However, in order to be transparent to the CPRI interface, it is necessary to link the phase of local CPRI clock signal 50 at the adaptor 32 to the phase of the master CPRI clock. Two example methods of establishing this time-base association include: (1) adding dedicated incremental timing parameters to the CoE packet structure; or (2) configuring the adaptor 32 to examine the contents of the CPRI control information part of the CPRI basic frame within incoming CoE packets.

In embodiments where the adaptor 30 is fully integrated into the REC 12, timing in the adaptor 30 is directly derived from the clock domain of the REC 12. In embodiments where the adaptor 30 is physically separate from the REC 12, the CPRI link 24 extends the CPRI timing to the adaptor 30. Similarly, use of the CPRI link 28 allows the adaptor 32 to be implemented physically separate from the RE 16. Of course, this disclosure also contemplates direct integration of the adaptor 32 into the RE 16.

Figure 12:
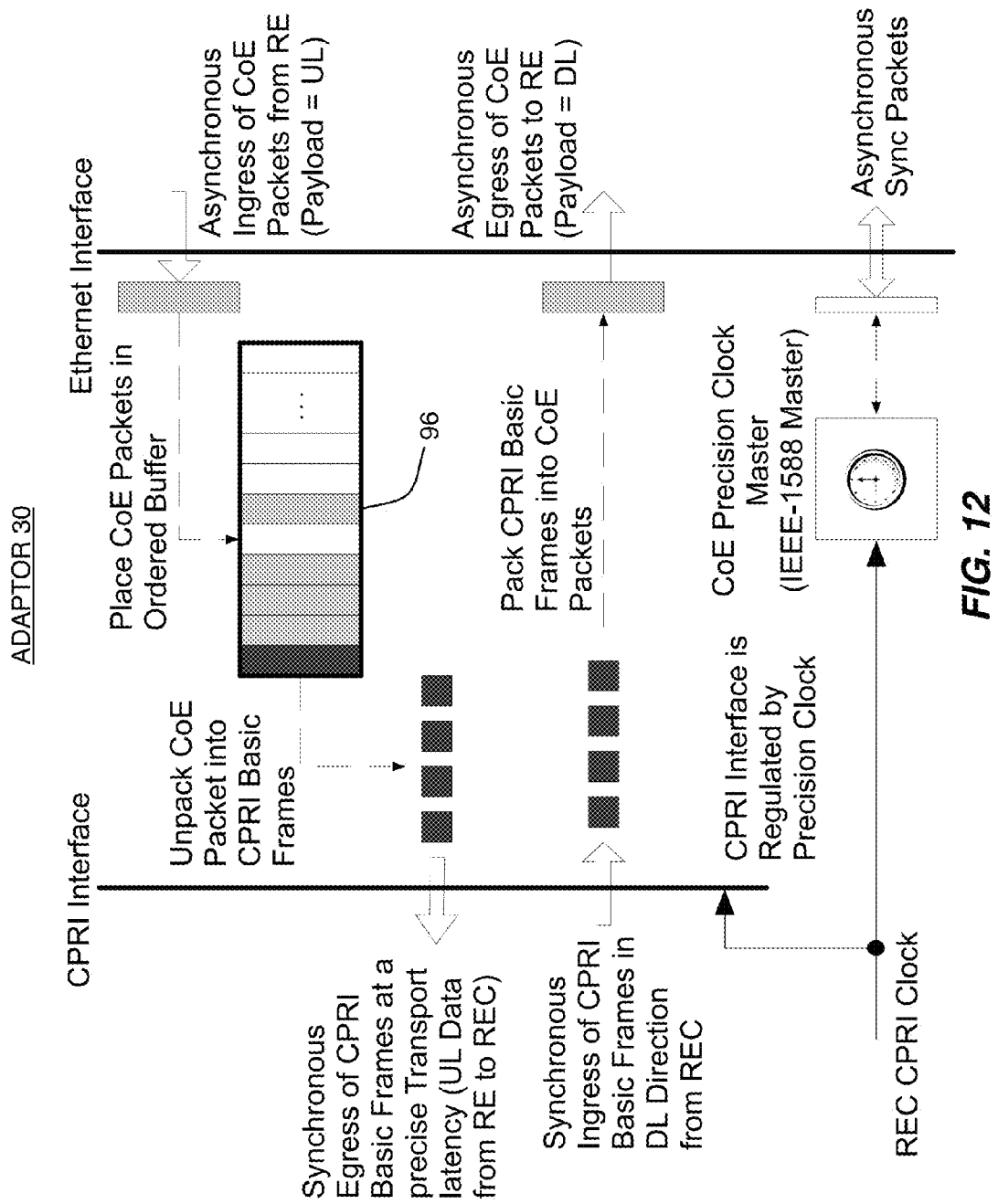
FIG. 12 is an illustration of example functional operations for the REC-side adaptor of FIG. 10.
Figure 13:
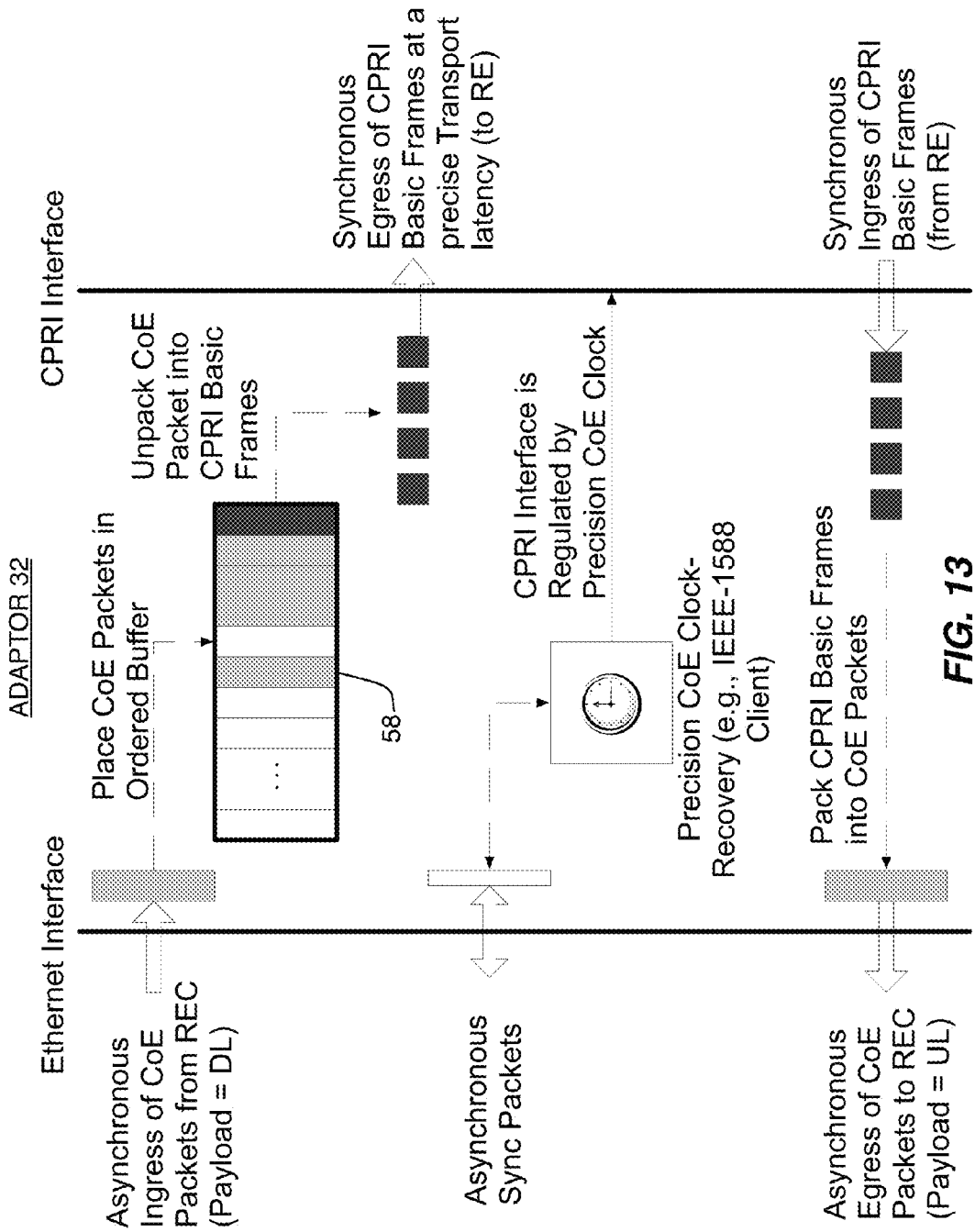
FIG. 13 is an illustration of example functional operations for the RE-side adaptor of FIG. 11.

In the context of physical separation between the REC 12 and the adaptor 30, FIG. 12 illustrates functional operations within the adaptor 30, for the Ethernet context. Similarly, FIG. 13 illustrates functional operations within the adaptor 32, again for the Ethernet context.

Figure 14:
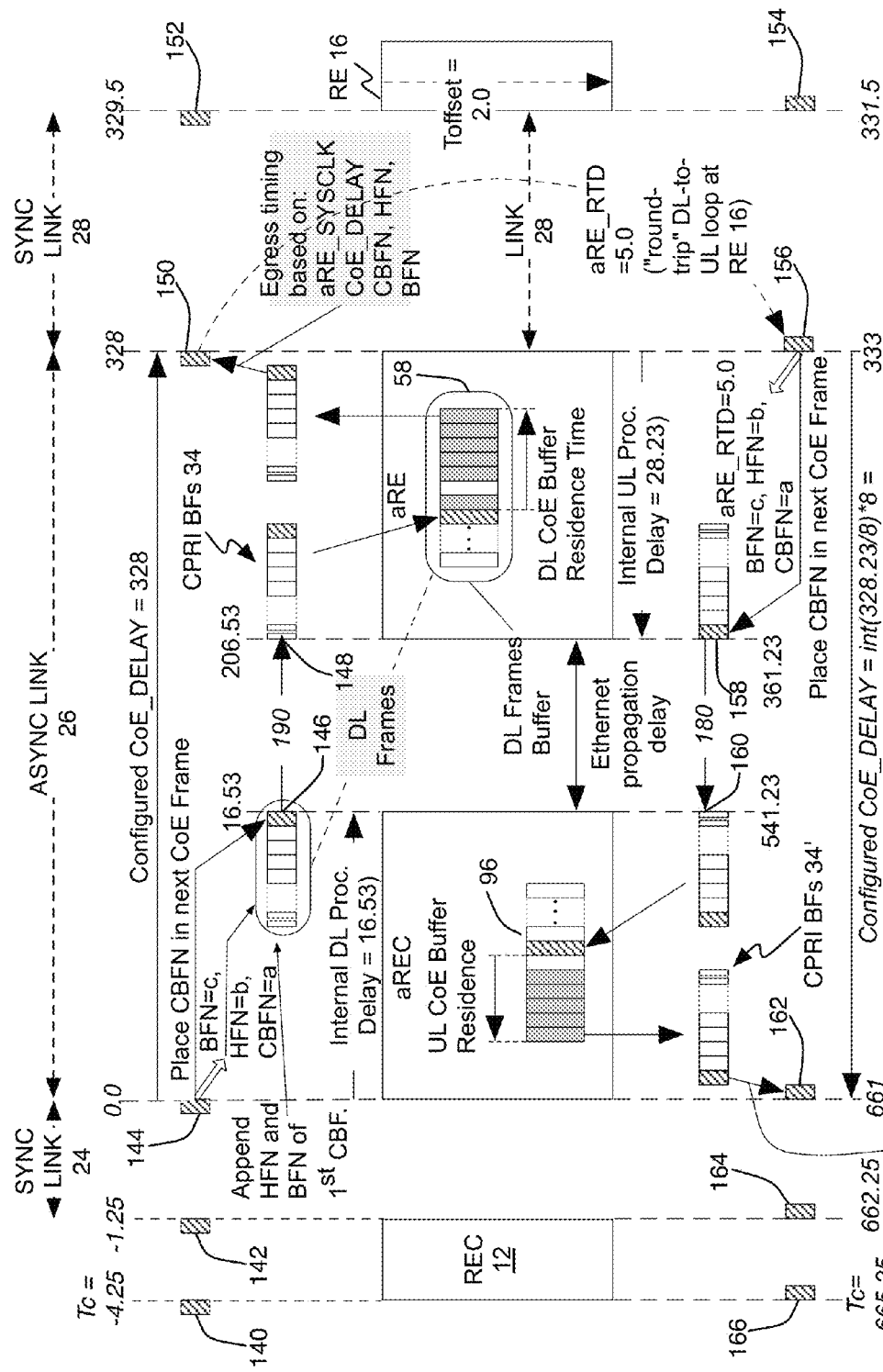
FIG. 14 is an illustration of overall functional operations and attendant delays for the example depicted in FIG. 10.

FIG. 14 depicts an overall picture of operation for an Ethernet-specific example, where "CoE" denotes "CPRI over (asynch) Ethernet." FIG. 14 particularly emphasizes the example delays associated with each incremental stage or step. These delays are expressed in units of "Tc" and the various Tc delay values are presented in italicized text at key points in the downlink and uplink directions. As previously explained, the value of Tc relates to the CPRI line bit rates, which allow easy recovery of the basic UMTS chip rate of 3.84 Mbps from the line bit rate. The length of a CPRI basic frame is 1 Tc=1/3.84 MHz=260.416667 ns.

Referring now to illustrated details, one sees an "ingress" point 140 at the REC 12, for incoming user traffic, etc., e.g., downlink data targeted to a given UE 18. The processing circuitry within the REC 12, including CPRI processing circuitry, generates a corresponding CPRI-compliant output stream of CPRI basic frames 34 (not explicitly shown) in the downlink direction, exiting from the REC's synchronous egress point 142. Those CPRI basic frames 34 enter the synchronous ingress point 144 of the adaptor 30. Using that point as the Tc reference, the downlink data ingress point 140 of the REC 12 is at Tc=−4.25, the synchronous egress point 142 is at Tc=−1.25, and the synchronous ingress point 144 is at Tc=0.

As explained in detail earlier herein, the adaptor 30 receives CPRI basic frames 34 incoming to its synchronous ingress point 144 from the REC 12 over the synchronous link 24, and "packages" them into asynchronous link packets for transport on the asynchronous link 26. One sees those packets egressing the asynchronous egress point 146 of the adaptor 30 at the relative time Tc=16.53, meaning that the internal processing delay of the adaptor 30 between receiving CPRI basic frames 34 at its synchronous ingress point 144 and sending the same CPRI basic frames 34 from the asynchronous link egress point 146 in asynchronous link packet(s) is 16.53 in units of Tc.

In the example, those asynchronous packets incur a (variable) transport delay of Tc=190 as they flow over the asynchronous link 26 in the downlink direction, arriving at the asynchronous ingress point 148 of the adaptor 32 with a then-accumulated delay of Tc=206.53. In accordance with the previous descriptions, the adaptor 32 unpacks the received CPRI basic frames 34 and puts them into its downlink synchronization buffer 58, for synchronous clocking out towards the RE 16 as a CPRI-compliant synchronous stream from the synchronous egress point 150 of the adaptor 32. Including the compensating buffer residency times imparted by the adaptor 32, the accumulated delay at the synchronous egress point 150 is Tc=328.

The CPRI basic frames 34 flow synchronously from the egress point 150 over the synchronous link 28, and are received by the RE 16 at its synchronous ingress point 152, at a then-accumulated delay of Tc=329.5. The RE 16 generates downlink transmissions from the received CPRI basic frames 34 and packages received uplink data into corresponding CPRI basic frames 34' for transport back to the REC 12. While not explicitly shown in FIG. 14, it will be understood that these CPRI basic frames 34' exit synchronously from the RE 16 at its synchronous link egress point 154, flow over the synchronous link 28, and are received at the adaptor 32 on its synchronous link ingress point 156. The then-accumulated delay at the synchronous link egress point 154 is Tc=331.5, and is Tc=333 at the synchronous link ingress point 156. (Note that the time difference in units of Tc from the synchronous link egress point 150 to the synchronous link ingress point 156 is Tc=5, i.e., the observed DL/UL delay at the adaptor 32 is aRE_RTD=5.)

The adaptor 32 packages the CPRI basic frames 34' into asynchronous uplink packets for transport over the asynchronous link 26 to the adaptor 30, and the accumulated delay at the asynchronous link egress point 158 of the adaptor 30 is Tc=361.23 (accounting for the internal processing delay of adaptor 32). The asynchronous uplink packets flow to the adaptor 30 and are received on its asynchronous link ingress point 160, with a then-accumulated delay of Tc=541.23. The adaptor 30 unpackages the CPRI basic frames 34' and buffers them in its synchronization buffer 96, for synchronous, CPRI-compliant clocking from its synchronous link egress point 162 towards the REC 12. Allowing for the compensating effects of synchronization buffer residency times, the then-accumulated delay at the synchronous link egress point 162 is Tc=661. This buffer egress timing is maintained based on aRE_RTD, the CPRI clock of the REC 12/adaptor 30 (noted in the drawing as aREC_SYSCLOCK), the asynchronous link delay value (noted CoE_Delay), and the CBFN, HFN, and BFN associated with the CPRI basic frames 34' unpackaged from each asynchronous uplink packet received at the adaptor 30 on its asynchronous link ingress point 160.

The synchronous, CPRI-compliant stream of CPRI basic frames 34' flowing from the synchronous link egress point 162 of the adaptor 30 are received by the REC 12 on its synchronous link ingress point 164 at a then-accumulated delay of Tc=662.25. That value is held constant (within allowable variation) by the overall "system" operation of adaptors 30 and 32, and CPRI timing compliance is thereby maintained from the perspectives of the REC 12 and the RE 16. The uplink data extracted by the REC 12 from the CPRI basic frames 34' exits (e.g., toward the core network) from the REC's uplink data egress point 166 at a final accumulated delay of Tc=665.25, which accounts for internal processing of the REC 12.

With the above example details in mind, those skilled in the art will understand that the present invention transfers baseband samples and CPRI overhead information between the REC 12 and the RE 16 asynchronously in one Ethernet flow, and transfers synchronization information in a separate Ethernet packet flow. Baseband samples and CPRI overhead information are transferred at the granularity of CPRI basic frames with an integer number of CPRI basic frames per Ethernet packet, thus retaining the CPRI protocol encapsulation (which is why these Ethernet packets were earlier referred to as CoE packets). These CoE packets may be understood as a specific example of the downlink packet flow 40 introduced in FIG. 3.

The master CPRI clock at the REC 12 is recovered at the RE 16 using the synchronization packet flow 42. The recovered clock is used to regulate the baseband samples and their transition between the asynchronous and synchronous domains at the adaptor 32/RE 16.

Synchronization information parameters within the CPRI overhead (control words) are retained in the downlink packet flow 40 for the purpose of CPRI protocol transparency. Advantageously, however, synchronization functionality is achieved at the adaptor 32 independent from the CPRI overhead included in the CPRI basic frames transported in the downlink packet flow 40. Instead, CPRI synchronization is achieved at the adaptor 32 using clock recovery from the separate synchronization packet flow 42. This synchronization is done in a manner that appears to the CPRI synchronization layer to have a static delay regardless of phase/frequency deviations between the recovered clock at the adaptor 32 and the master clock at the REC 12. Hence functional synchronization transparency is achieved and compliance with the CPRI protocol requirements at the REC 12 and at the RE 16 is maintained. More generally, by retaining the CPRI encapsulation, in principle, an Ethernet transport layer can be implemented transparently to RECs 12 and REs 16 that use the CPRI protocol, thus maintaining compatibility with such modules even though asynchronous transport links are used.

Broadly, the teachings presented herein may be understood in one aspect as providing a "system" for linking a CPRI-compliant radio equipment controller to a CPRI-compliant item of radio equipment via an asynchronous communication link. The contemplated system includes a first adaptor (the REC-side adaptor 30) having a synchronous communication link interface for coupling to the radio equipment controller and an asynchronous communication link interface for coupling to the asynchronous communication link. The second adaptor (the RE-side adaptor 32) has a synchronous communication link interface for coupling to the item of radio equipment and an asynchronous communication link interface for coupling to the asynchronous communication link.

The first adaptor is configured to send, and the second adaptor is configured to receive, a unidirectional downlink packet flow comprising downlink packets encapsulating CPRI basic frames synchronously received at the first adaptor from the radio equipment controller in the downlink direction. Similarly, the second adaptor is configured to send, and the first adaptor is configured to receive, a unidirectional uplink packet flow comprising uplink packets encapsulating CPRI basic frames synchronously received at the second adaptor from the item of radio equipment in the uplink direction.

Advantageously, the first and second adaptors are configured to exchange CPRI synchronization information in a bi-directional synchronization packet flow exchanged between them over the asynchronous communication link, wherein the synchronization packet flow is separate from the downlink and uplink packet flows, which allows those flows to carry "standard," protocol-compliant CPRI basic frames.

Further according to the contemplated system, the first adaptor is configured to impose variable buffering times on the CPRI basic frames received in the uplink packet flow, to convert a variable delay of the asynchronous communication link in the uplink direction into a fixed delay. Likewise, the second adaptor is configured to impose variable buffering times on the CPRI basic frames received in the downlink packet flow, to convert a variable delay of the asynchronous communication link in the downlink direction into a fixed delay.

Imposing dynamically varied buffering times in this manner hides or otherwise masks the inherent delay variability of the asynchronous communication link. The variable buffering thus allows the first adaptor to provide the CPRI basic frames received in the uplink direction to the radio equipment controller in a synchronous, CPRI-compliant stream, and allows the second adaptor to provide the CPRI basic frames received in the downlink direction to the item of radio equipment in a synchronous, CPRI-compliant stream.

In one embodiment of the system, the first adaptor—e.g., the adaptor 30—is configured to include supplemental synchronization information in each downlink packet sent in the downlink packet flow. The supplemental synchronization information comprises a NodeB Radio Frame Number (BFN) and an associated Hyper Frame Number (HFN), along with a CPRI Basic Frame Number (CBFN) for a first one of the CPRI basic frames included in the downlink packet. The second adaptor—e.g., the adaptor 32—is configured to determine the variable delay of the asynchronous communication link in the downlink direction using the supplemental synchronization information, and further to determine a correct ordering of any downlink packets received out of order using the supplemental synchronization information.

In the same embodiment, the second adaptor is configured to include the supplemental synchronization information corresponding to the CPRI basic frames included in each uplink packet sent in the uplink packet flow, and to add to the supplemental information a round-trip delay time observed at the second adaptor between the CPRI basic frames sent from the second adaptor to the RE 16 in the downlink direction and the corresponding CPRI basic frames received at the second adaptor from the RE 16 in the uplink direction—see the delay aRE_RTD in FIGS. 2 and 14 for an illustration of this observed delay. Further, the first adaptor is configured to determine an overall round-trip delay between the CPRI basic frames exiting a downlink egress point of the radio equipment controller and the corresponding CPRI basic frames entering an uplink ingress point of the radio equipment controller, including the round-trip delay observed at the second adaptor.

Further, the first adaptor is configured to use a CPRI clock synchronized to the CPRI timing of the radio equipment controller, along with the supplemental synchronization information included in each uplink packet, to regulate the insertion of CPRI basic frames received in the uplink packet flow into a synchronization buffer in correct ordering, and to regulate the extraction of those CPRI basic frames for synchronous transmission to the uplink ingress point of the radio equipment controller via a synchronous CPRI interface of the first adaptor.

With this arrangement, the round trip delay of a CPRI Basic Frame sent on the downlink and returned on the uplink as observed by REC 12 will be static except for variations in the local round-trip delay observed at the adaptor 32 (aRE_RTD in FIG. 14) and the CPRI links between the REC and adaptor 30, where these variations are expected to be very low compared to the CPRI standard requirement of overall round trip delay accuracy of +/−Tc/16, where Tc is the duration of a single CPRI basic frame.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of synchronizing asynchronously distributed downlink data for transmission by an item of radio equipment, said method implemented in an asynchronous-to-synchronous adaptor associated with the item of radio equipment and comprising:
   generating a local Common Public Radio Interface (CPRI) clock responsive to CPRI synchronization data exchanged over an asynchronous communication link having a variable link delay;
   receiving the downlink data as CPRI basic frames sent asynchronously over the asynchronous communication link;
   buffering the CPRI basic frames in transmit order within a synchronization buffer that is clocked as a function of the local CPRI clock, including placing the received CPRI basic frames into buffer positions that impose buffer residency times on the buffered CPRI basic frames that add to their variable link delays to yield a defined static link delay common to all CPRI basic frames at a sequential output of the synchronization buffer; and
   clocking the CPRI basic frames sequentially out from the synchronization buffer as a function of the local CPRI clock, for synchronous transfer to said item of radio equipment, for downlink transmission.

2. The method of claim 1, wherein receiving the CPRI basic frames over the asynchronous communication link as said downlink data comprises receiving a first Ethernet flow over an Ethernet link having one or more routing hops, said first Ethernet flow being unidirectional and comprising a series of first Ethernet frames, each including a number of the CPRI basic frames and supplemental synchronization information, and wherein the CPRI synchronization data exchanged over the asynchronous communication link comprises the adaptor supporting a second bi-directional Ethernet flow over the Ethernet link, said second Ethernet flow being bidirectional and comprising a series of second Ethernet frames including CPRI clock synchronization data being exchanged between the adaptor and another adaptor associated with a radio equipment controller that is originating the downlink data.

3. The method of claim 2, wherein said supplemental synchronization information in each first Ethernet frame comprises a CPRI timestamp for one of the included CPRI basic frames, and said placing the received CPRI basic frames into said buffer positions includes determining the variable link delay experienced by the CPRI basic frames included in each first Ethernet frame from said CPRI timestamp and said local CPRI clock.

4. The method of claim 2, wherein said CPRI time stamp in each first Ethernet frame comprises a NodeB Radio Frame Number (BFN) and a Hyper Frame Number (HFN), and a CPRI Basic Frame Number (CBFN) associated with a first one of the CPRI basic frames included in the first Ethernet frame, and further comprising determining a correct ordering of the CPRI basic frames across two or more of the first Ethernet frames based on said HFN, BFN, and CBFN.

5. The method of claim 1, wherein said receiving the downlink data as said CPRI basic frames sent over the asynchronous communication link comprises receiving downlink packets in a downlink packet flow, each packet encapsulating a number of CPRI basic frames and a CPRI timestamp for one of the CPRI basic frames included in the packet, and wherein the method includes determining the variable link delay of the asynchronous communication link as experienced by the packet from the CPRI timestamp.

6. The method of claim 1, wherein said Common Public Radio Interface (CPRI) synchronization data is exchanged via an IEEE 1588 clock synchronization flow that is referenced to a master CPRI clock associated with CPRI synchronization at a radio equipment controller originating the downlink data.

7. The method of claim 1, wherein said buffering of the CPRI basic frames in transmit order within the synchronization buffer comprises arranging the CPRI basic frames in their original order of egress from the radio equipment controller, and replacing any missing CPRI basic frames with synthesized basic frames formed from artificial baseband samples and synthesized CPRI control data, where CPRI control data parameters are synthesized using default values, or are based on previous actual values, or are dynamically determined based on a CBFN and a Hyperframe Number (HFN) associated with the missing CPRI basic frames.

8. The method of claim 1, further comprising accounting for missing CPRI basic frames by inserting into the synchronization buffer, in observance of the transmit order, synthesized baseband data and control information, as needed.

9. The method of claim 1, wherein the CPRI basic frames carrying said downlink data are referred to as first CPRI basic frames, which are received in asynchronous downlink packets each including a defined number of the first CPRI basic frames and corresponding supplemental synchronization information, and wherein the method further comprises receiving second CPRI basic frames synchronously in an uplink direction from the item of radio equipment, said second CPRI basic frames carrying uplink data and having CPRI Basic Frame Numbers (CBFNs) corresponding to the CBFNs of the first CPRI basic frames, and further comprising asynchronously transferring the second CPRI basic frames in the uplink direction via said asynchronous communication link by encapsulating them into asynchronous uplink packets, each said asynchronous uplink packet including the supplemental synchronization information received for the corresponding first CPRI basic frames, as modified to include an observed delay between the first CPRI basic frames synchronously sent to the item of radio equipment and the corresponding second CPRI basic frames synchronously received from the item of radio equipment.

10. An apparatus configured to operate as an asynchronous-to-synchronous adaptor for synchronizing asynchronously distributed downlink data for transmission by an item of radio equipment, said apparatus comprising:
    an asynchronous communication link interface configured to generate a local Common Public Radio Interface (CPRI) clock responsive to CPRI synchronization data exchanged over an asynchronous communication link having a variable link delay, and to further receive the downlink data as CPRI basic frames sent asynchronously over the asynchronous communication link;
    a clock recovery unit configured to generate a local CPRI clock slaved to the CPRI synchronization data;
    a synchronization buffer comprising a sequential series of buffer positions, wherein each buffer position corresponds to a defined buffer residency time; and
    a delay management unit configured to buffer the CPRI basic frames in the synchronization buffer by placing the received CPRI basic frames in transmit order into buffer positions of the synchronization buffer that impose buffer residency times on the CPRI basic frames that add to their variable link delays to yield a defined static link delay common to all CPRI basic frames at a sequential output of the synchronization buffer;
    a buffer clock unit that is configured to clock the CPRI basic frames sequentially out from the synchronization buffer as a function of the local CPRI clock; and
    a CPRI interface configured for synchronous transfer of the CPRI basic frames from said synchronization buffer to said item of radio equipment.

11. The apparatus of claim 10, wherein said asynchronous communication link interface comprises an Ethernet interface, and wherein the apparatus is configured to receive a first Ethernet flow over an Ethernet link having one or more routing hops, said first Ethernet flow comprising a series of first Ethernet frames each including a number of the CPRI basic frames comprising said downlink data, and each first Ethernet frame further including supplemental synchronization information.

12. The apparatus of claim 11, wherein the apparatus is further configured to exchange said CPRI synchronization data via a second, bi-directional Ethernet flow over the Ethernet link, said second Ethernet flow comprising a series of second Ethernet frames each including CPRI clock synchronization data.

13. The apparatus of claim 11, wherein said supplemental synchronization information in each first Ethernet frame comprises a CPRI timestamp for one of the included CPRI basic frames, and wherein said delay management unit is configured to place the received CPRI basic frames into said buffer positions based on being configured to determine the variable link delay experienced by the CPRI basic frames included in each first Ethernet frame from said CPRI timestamp and said local CPRI clock.

14. The apparatus of claim 11, wherein said CPRI timestamp included in each first Ethernet frame comprises a NodeB basic frame number (BFN) and a hyper frame number (HFN), along with a CPRI Basic Frame Number (CBFN) associated with a first one of the CPRI basic frames included in the first Ethernet frame, and wherein said delay management unit is configured to determine a correct ordering of the CPRI basic frames across two or more of the first Ethernet frames based on said BFN, HFN and CBFN.

15. The apparatus of claim 10, wherein said apparatus is configured to receive the downlink data via its asynchronous communication link based on being configured to receive asynchronous downlink packets in a downlink packet flow, each such packet comprising a number of the CPRI basic frames and a CPRI timestamp for one of the CPRI basic frames included in the packet, and wherein said delay management unit is configured to determine the variable link delay of the asynchronous communication link as experienced by the packet from the included CPRI timestamp.

16. The apparatus of claim 10, wherein said apparatus is configured to exchange the CPRI synchronization data via a bi-directional IEEE 1588 clock synchronization flow over said asynchronous communication link, and wherein said clock recovery unit is configured to generate the local CPRI clock referenced to a master CPRI clock associated with CPRI synchronization at a radio equipment controller originating the downlink data.

17. The apparatus of claim 10, wherein said delay management unit is configured to buffer the CPRI basic frames in transmit order within the synchronization buffer by arranging the CPRI basic frames in their original order of egress from a radio equipment controller, and replacing any missing CPRI basic frames with synthesized basic frames formed from artificial baseband samples and synthesized CPRI control data.

18. The apparatus of claim 10, wherein said delay management unit is further configured to detect missing CPRI basic frames and to account for them by inserting into the synchronization buffer, on an as needed basis and in observance of the transmit order, synthesized baseband data and control information.

19. The apparatus of claim 10, wherein the CPRI basic frames carrying said downlink data are referred to as first CPRI basic frames, which are received in asynchronous downlink packets each including a defined number of the first CPRI basic frames and corresponding supplemental synchronization information, and wherein the apparatus is configured to receive second CPRI basic frames synchronously in an uplink direction from the item of radio equipment, said second CPRI basic frames carrying uplink data and having CPRI Basic Frame Numbers (CBFNs) corresponding to the CBFNs of the first CPRI basic frames, and further wherein the apparatus is configured to asynchronously transfer the second CPRI basic frames in the uplink direction via said asynchronous communication link by encapsulating them into asynchronous uplink packets, each said asynchronous uplink packet including the supplemental synchronization information received for the corresponding first CPRI basic frames, as modified to include an observed delay between the first CPRI basic frames synchronously sent to the item of radio equipment and the corresponding second CPRI basic frames synchronously received from the item of radio equipment.

20. A method of asynchronously distributing downlink data for synchronized transmission by an item of radio equipment, said method implemented in a synchronous-to-asynchronous adaptor associated with a radio equipment controller originating said downlink data and comprising:
exchanging a Common Public Radio Interface (CPRI) synchronization flow over an asynchronous communication link with an asynchronous-to-synchronous adaptor at the item of radio equipment;
encapsulating CPRI basic frames received from the radio equipment controller for asynchronous transport over the asynchronous communication link, including forming downlink packets for asynchronous transport over the asynchronous communication link, each of the downlink packets including a number of the CPRI basic frames received from the radio equipment controller and including supplemental synchronization information comprising a CPRI timestamp for one of the included CPRI basic frames; and
sending the downlink packets to the asynchronous-to-synchronous adaptor at the item of the radio equipment in a downlink packet flow over the asynchronous communication link, said downlink packet flow separate from the CPRI synchronization flow;
wherein said CPRI basic frames are received from the radio equipment controller via a synchronous communication link according to a master CPRI timing maintained at the radio equipment controller, and wherein said CPRI basic frames include downlink data for transmission by the item of radio equipment.

21. The method of claim 20, wherein the asynchronous communication link comprises an Ethernet link having one or more routing hops and said sending the downlink packet flow and the CPRI synchronization flow comprises sending separate first and second Ethernet flows.

22. The method of claim 20, wherein the supplemental synchronization information included in each downlink packet sent in the downlink packet flow further includes a Hyper Frame Number (HFN) and a Basic Frame Number (BFN) representing radio network timing values associated with the CPRI basic frames included in the packet.

23. The method of claim 20, wherein said generating the downlink packets includes assembling the CPRI basic frames into the downlink packets according to their order of receipt from the radio equipment controller.

24. The method of claim 20, wherein said CPRI synchronization flow comprises an IEEE 1588 clock synchronization flow.

25. An apparatus configured to operate as a synchronous-to-asynchronous adaptor for asynchronously distributing downlink data for synchronized transmission by an item of radio equipment, said apparatus associated with a radio equipment controller originating said downlink data and comprising:
a synchronous communication link interface configured to receive CPRI basic frames generated by the radio equipment controller, said CPRI basic frames including the downlink data for transmission by the item of radio equipment;
a downlink data unit configured to group the CPRI basic frames received from the radio equipment controller and to determine supplemental synchronization information for each such group, said supplemental synchronization information comprising a CPRI timestamp for one of the CPRI basic frames in each group;
a synchronization unit configured to generate CPRI synchronization information referenced to a CPRI clock signal of the radio equipment controller; and
an asynchronous communication link interface configured to cooperate with the downlink data unit to form downlink packets, each of the downlink packets including one of the groups of the CPRI basic frames and the corresponding supplemental synchronization information, and to send the downlink packets asynchronously over an asynchronous communication link to an asynchronous-to-synchronous adaptor at the item of radio equipment, and further configured to cooperate with the synchronization unit to exchange CPRI timing information with the asynchronous-to-synchronous adaptor at the item of radio equipment via a synchronization packet flow carried on the asynchronous communication link.

26. The apparatus of claim 25, wherein the asynchronous communication link comprises an Ethernet link having one or more routing hops and said asynchronous communication link interface comprises an Ethernet interface that is configured to send the downlink packets in a first Ethernet packet flow, as said downlink packet flow, and to exchange the CPRI synchronization information in a second Ethernet flow, as said synchronization packet flow.

27. The apparatus of claim 25, wherein the downlink data unit is configured to include in said supplemental synchronization information a Basic Frame Number (BFN) and a Hyper Frame Number (HFN) associated with the corresponding group of the CPRI basic frames, where said BFN and HFN are radio network timing values associated with the included CPRI basic frames.

28. The apparatus of claim 25, wherein the downlink data unit is configured to group the CPRI basic frames for encapsulation into said downlink packets according to the order of receipt for the CPRI basic frames from the radio equipment controller.

29. The apparatus of claim 25, wherein said synchronization unit and said asynchronous communication link interface are configured to establish or otherwise maintain the synchronization packet flow as an IEEE 1588 clock synchronization flow.

30. A system for linking a CPRI-compliant radio equipment controller to a CPRI-compliant item of radio equipment via an asynchronous communication link, said system comprising:
a first adaptor having a synchronous communication link interface for coupling to the radio equipment controller and a first asynchronous communication link for coupling to the asynchronous communication link;
a second adaptor having a synchronous communication link interface for coupling to the item of radio equipment and a second asynchronous communication link for coupling to the asynchronous communication link;
said first adaptor configured to send, and said second adaptor configured to receive, a unidirectional downlink packet flow comprising downlink packets encapsulating CPRI basic frames synchronously received at the first adaptor from the radio equipment controller in a downlink direction;
said second adaptor configured to send, and said first adaptor configured to receive, a unidirectional uplink packet flow comprising uplink packets encapsulating CPRI basic frames synchronously received at the second adaptor from the item of radio equipment in an uplink direction;

said first and second adaptors configured to exchange CPRI synchronization information in a bi-directional synchronization packet flow exchanged between them over the asynchronous communication link, wherein said synchronization packet flow is separate from said downlink and said uplink packet flows;

said first adaptor configured to impose variable buffering times on the CPRI basic frames received in the uplink packet flow, to convert a variable delay of the asynchronous communication link in the uplink direction into a fixed delay, and said second adaptor likewise configured to impose variable buffering times on the CPRI basic frames received in the downlink packet flow, to convert a variable delay of the asynchronous communication link in the downlink direction into a fixed delay; and wherein said first adaptor is configured to provide the CPRI basic frames received in the uplink direction to the radio equipment controller in a synchronous, CPRI-compliant stream, and said second adaptor is configured to provide the CPRI basic frames received in the downlink direction to the item of radio equipment in a synchronous, CPRI-compliant stream.

31. The system of claim 30, wherein said first adaptor is configured to include supplemental synchronization information in each downlink packet sent in the downlink packet flow, said supplemental synchronization information comprising a NodeB Radio Frame Number (BFN) and an associated Hyper Frame Number (HFN), along with a CPRI Basic Frame Number (CBFN) for a first one of the CPRI basic frames included in the downlink packet, and wherein said second adaptor is configured to determine the variable delay of the asynchronous communication link in the downlink direction using the supplemental synchronization information, and further to determine a correct ordering of any downlink packets received out of order using the supplemental synchronization information.

32. The system of claim 31, wherein said second adaptor is configured to include the supplemental synchronization information corresponding to the CPRI basic frames included in each uplink packet sent in the uplink packet flow, and to add to said supplemental information a round-trip delay time observed at the second adaptor between the CPRI basic frames sent from the second adaptor to the item of radio equipment in the downlink direction and the corresponding CPRI basic frames received at the second adaptor from the item of radio equipment in the uplink direction, and wherein said first adaptor is configured to determine an overall round-trip delay between the CPRI basic frames exiting a downlink egress point of the radio equipment controller and the corresponding CPRI basic frames entering an uplink ingress point of the radio equipment controller, including the round-trip delay observed at the second adaptor.

33. The system of claim 32, wherein said first adaptor is configured to use a CPRI clock synchronized to the CPRI timing of the radio equipment controller, along with the supplemental synchronization information included in each of the uplink packets, to regulate the insertion of CPRI basic frames into a synchronization buffer in correct ordering, and to regulate the extraction of those CPRI basic frames for synchronous transmission to the uplink ingress point of the radio equipment controller via a synchronous CPRI interface of the first adaptor.

* * * * *